US012492228B2

(12) United States Patent
Kim et al.

(10) Patent No.: US 12,492,228 B2
(45) Date of Patent: Dec. 9, 2025

(54) CRM197 PROTEIN EXPRESSION METHOD

(71) Applicants: GENOFOCUS CO., LTD., Daejeon (KR); EUBIOLOGICS.CO., LTD, Seoul (KR)

(72) Inventors: Jeong Hyun Kim, Gyeonggi-do (KR); Hyun-Do Kim, Gwangju (KR); Eun-Hye Park, Daejeon (KR); Jung Hyun Kang, Daejeon (KR); Jae Gu Pan, Sejong (KR); Eui Joong Kim, Daejeon (KR); Chankyu Lee, Gangwon-do (KR); Minchul Park, Gyeonggi-do (KR)

(73) Assignees: GENOFOCUS CO., LTD., Daejeon (KR); EUBIOLOGICS.CO., LTD., Seoul (KR)

( * ) Notice: Subject to any disclaimer, the term of this patent is extended or adjusted under 35 U.S.C. 154(b) by 940 days.

(21) Appl. No.: 17/638,822

(22) PCT Filed: Oct. 2, 2019

(86) PCT No.: PCT/KR2019/012899
§ 371 (c)(1),
(2) Date: Feb. 26, 2022

(87) PCT Pub. No.: WO2021/045292
PCT Pub. Date: Mar. 11, 2021

(65) Prior Publication Data

US 2022/0281928 A1 Sep. 8, 2022

(30) Foreign Application Priority Data

Sep. 3, 2019 (KR) ........................ 10-2019-0108892

(51) Int. Cl.

| | |
|---|---|
| ***C12P 21/02*** | (2006.01) |
| ***A61K 39/05*** | (2006.01) |
| ***C07K 7/08*** | (2006.01) |
| ***C07K 14/34*** | (2006.01) |

(52) U.S. Cl.
CPC ................ *C07K 14/34* (2013.01); *C07K 7/08* (2013.01); *C07K 2319/02* (2013.01)

(58) Field of Classification Search
None
See application file for complete search history.

(56) References Cited

U.S. PATENT DOCUMENTS

| | | | |
|---|---|---|---|
| 4,186,183 | A | 1/1980 | Steck et al. |
| 4,217,344 | A | 8/1980 | Vanlerberghe et al. |
| 4,235,871 | A | 11/1980 | Papahadjopoulos et al. |
| 4,261,975 | A | 4/1981 | Fullerton et al. |
| 4,485,054 | A | 11/1984 | Mezei et al. |
| 4,501,728 | A | 2/1985 | Geho et al. |
| 4,774,085 | A | 9/1988 | Fidler |
| 4,837,028 | A | 6/1989 | Allen |
| 4,946,787 | A | 8/1990 | Eppstein et al. |
| 9,561,268 | B2 | 2/2017 | Ceddia et al. |
| 2015/0184215 | A1 | 7/2015 | Hsu et al. |
| 2015/0376245 | A1 | 12/2015 | Ihssen et al. |

FOREIGN PATENT DOCUMENTS

| | | | |
|---|---|---|---|
| EP | 3087088 | B1 | 5/2022 |
| KR | 1020030014959 | A | 2/2003 |
| KR | 1020090039239 | A | 4/2009 |
| KR | 1020150082968 | A | 7/2015 |
| KR | 1020160128362 | A | 11/2016 |
| RU | 2575621 | C1 | 2/2016 |
| WO | 2011042516 | A2 | 4/2011 |
| WO | 2011123139 | A1 | 10/2011 |
| WO | 2012140171 | A1 | 10/2012 |
| WO | 2013178974 | A | 12/2013 |
| WO | 2015100277 | A2 | 7/2015 |
| WO | 2015134402 | A1 | 9/2015 |
| WO | 2017216286 | A1 | 12/2017 |

(Continued)

OTHER PUBLICATIONS

Ahmad, I., et al., "Antibody-mediated Specific Binding and Cytotoxicity of Liposome-entrapped Doxorubicin to Lung Cancer Cells in Vitro", Cancer Research, 1992, pp. 4817-4820, vol. 52.

Behr, J-P, "Gene Transfer with Synthetic Cationic Amphiphiles: Prospects for Gene Therapy", Bioconjugate Chem., 1994, pp. 382-389, vol. 5, Publisher: American Chemical Society.

Bishai, W.R. , et al., "High-Level Expression of a Proteolytically Sensitive Diphtheria Toxin Fragment in *Escherichia coli*", Journal of Bacteriology, 1987, pp. 5140-5151, vol. 169, No. 11, Publisher: American Society for Microbiology.

Bruce, C., et al., "Diphtheria toxin and its ADP-ribosyltransferase-defective homologue CRM197 possess deoxyribonuclease activity", Biochemistry, 1990, pp. 2995-2998, vol. 87, Publisher: Proc. Natl. Acad. Sci. USA.

(Continued)

*Primary Examiner* — David Steadman
(74) *Attorney, Agent, or Firm* — HULTQUIST, PLLC; Steven J. Hultquist

(57) ABSTRACT

The present invention relates to a signal sequence for expressing a CRM197 protein in *Escherichia coli* and secreting same into the periplasm, and a use thereof, and more specifically, to: a signal sequence for expressing a CRM197 protein; a nucleic acid for coding the signal sequence; a nucleic acid construct or expression vector comprising the nucleic acid and a CRM197 protein gene; a recombinant microorganism having the nucleic acid construct or expression vector introduced therein; and a CRM197 protein production method comprising a step for culturing the recombinant microorganism. According to the present invention, a CRM197 protein having the same physicochemical/immunologic properties as the protein isolated from the parent bacteria may be expressed even in regular *Escherichia coli* of which a redox potential is not adjusted, and a CRM197 protein having high periplasmic secretion efficiency may be produced even without shifting the pH of a culture medium in order to increase secretion into the periplasm, and thus the present invention is very useful in CRM197 protein production.

10 Claims, 12 Drawing Sheets

Specification includes a Sequence Listing.

(56) References Cited

FOREIGN PATENT DOCUMENTS

| | | | |
|---|---|---|---|
| WO | 2019035058 | A1 | 2/2019 |
| WO | 2019143911 | A1 | 7/2019 |

OTHER PUBLICATIONS

Choi, J.H., et al., "Secretory and extracellular production of recombinant proteins using *Escherichia coli*", Appliec Microbiology and Biotechnology, 2004, pp. 625-635, vol. 64.

Crystal, R.G., "Transfer of Genes to Humans: Early Lessons and Obstacles to Success", Science, 1995, pp. 404-410, vol. 270.

Malito, E., et al., "Structural basis for lack of toxicity of the diphtheria toxin mutant CRM197", PNAS, 2012, pp. 5229-5234, vol. 109, No. 14.

Remy, J-S, et al., "Gene Transfer with a Series of Lipophilic DNA-Binding Molecules", Bioconjugate Chem., 1994, pp. 647-654, vol. 5, Publisher: American Chemical Society.

Shinefield, H.R., "Overview of the development and current use of CRM197 conjugate vaccines for pediatric use", Vaccine, 2010, pp. 4335-4339, vol. 28, Publisher: Elsevier.

Uchida, T., et al., "Diphtheria Toxin and Related Proteins", The Journal of Biological Chemistry, 1973, pp. 3838-3844, vol. 248, No. 11.

Office Action issued in Japanese Patent Application No. 2022-514680 on Apr. 19, 2023.

English Translation of Office Action issued in Japanese Patent Application No. 2022-514680 on Apr. 19, 2023.

"IV—Virion export protein—Enterobacteria phage fd (Bacterophage fd)", P03664, 2023, Publisher: Uniprot consortium.

"Putative secretin GspD—*Escheria coli* (Strain K12)", P45758, 2023, Publisher: Uniprot consortium.

Office Action Issued in counterpart Russian Patent Application No. 2022108470 on Feb. 28, 2023.

English Translation of Office Action Issued in counterpart Russian Patent Application No. 2022108470 on Feb. 28, 2023.

EESR Issued in European Patent Application No. 19944515.6 on Nov. 18, 2023.

PESR Issued in European Patent Application No. 19944515.6 on Jul. 31, 2023.

Goffin, P., et al., "High-yield production of recombinant CRM197, a non-toxic mutant of diptheria toxin, in the periplasm of *Escherichia coli*", Biotechnology Journal, 2017, DOI 10.1002/biot.201700168, vol. 12, No. 1700168, Publisher: Wiley-VCH Verlag GmbH & Co KGaA, Weinheim.

Notice of Allowance Issued in Russian Patent Application No. 2022108470 on Jul. 25, 2023.

English Translation of Notice of Allowance Issued in Russian Patent Application No. 2022108470 on Jul. 25, 2023.

Expression module TPB1Tv1.3 (1226 bp)

A

B

A

B

C

A

B

SEQUENCE LISTING

<160> NUMBER OF SEQ ID NOS: 56

<210> SEQ ID NO 1
<211> LENGTH: 1226
<212> TYPE: DNA
<213> ORGANISM: Artificial Sequence
<220> FEATURE:
<223> OTHER INFORMATION: Synthetic construct

<400> SEQUENCE: 1

```
tactgagcta ataacaggcc tgctggtaat cgcaggcctt tttatttctg gctcaccttc     60

gggtgggcct ttctgcgttt acggttctgg caaatattct gaaatgagct gttgacaatt    120

aatcatccgg ctcgtataat gtgtggaatt gtgagcggat aacaatttac tgctctttaa    180

caatttatca gatccaattg gaggaacaat atgggagacc acgcgcgcga ggtctcatct    240

gcggcggcag caggggggatc gatgagcaaa ggtgaagagc tgtttaccgg tgtggtgccg    300

attctggttg aactggatgg cgacgttaac ggccataaat tcagcgtcag cggcgagggc    360

gaaggggatg ccacctacgg taaactgacc ctgaagttta tttgcaccac cggcaaatta    420

ccggttccgt ggccgacgct ggtgacgacc tttagctatg gcgtgcagtg cttttcccgt    480

tatccggacc atatgaaaca gcatgatttt tttaaaagcg cgatgccgga aggctatgtt    540

caggaacgta ccattttctt taaggatgac ggcaattaca aaacccgcgc ggaagtgaaa    600

tttgaaggtg ataccctggt caaccgcatt gaactgaaag gcattgattt caaagaagat    660

ggtaatattc tcggtcataa gctggaatat aactacaaca gccataacgt ttatatcatg    720

gcggataaac aaaaaaacgg tattaaagtg aactttaaaa ttcgccataa tatcgaagat    780

ggtagcgtgc aactggcgga tcattatcag cagaacaccc caattggcga tggcccggtg    840

ttgctgccgg ataaccacta tctgagcacc cagtcggcgc tgagtaaaga tccgaacgaa    900

aaacgcgatc acatggtgct gctggagttt gtcaccgccg ccggtatcac ccacggcatg    960

gatgaactgt ataaataatg atttaaagcg gatatcaaat aaaacgaaag gctcagtcga   1020

aagactgggc ctttcgtttt atctgttgtt tgtcggtgaa cgctctcctg agtaggacaa   1080

atccgccggg agcggatttg aacgttgcga agcaacggcc cggagggtgg cgggcaggac   1140

gcccgccata aactgccagg catcaaatta agcagaaggc catcctgacg gatggccttt   1200

ttgcgtttct acaaactctt tttgtt                                          1226
```

<210> SEQ ID NO 2
<211> LENGTH: 1625
<212> TYPE: DNA
<213> ORGANISM: Artificial Sequence
<220> FEATURE:
<223> OTHER INFORMATION: Synthetic construct

<400> SEQUENCE: 2

```
gaagacacgg cgctgacgat gttgttgaca gcagcaagag ctttgttatg gagaatttca     60

gcagctatca cggcaccaaa ccgggctatg ttgacagcat tcagaaaggc atccaaaagc    120

cgaaaagcgg tacccagggc aactacgacg atgactggaa agagttttat agcaccgata    180

acaagtacga cgcggcgggc tatagcgttg ataacgaaaa cccgctgagc ggtaaagcgg    240

gtggcgtggt taaggtgacc tacccgggtc tgaccaaagt gctggcgctg aaggttgaca    300
```

```
acgcggaaac catcaagaaa gagctgggcc tgagcctgac cgaaccgctg atggagcagg    360
ttggtaccga ggaattcatt aagcgttttg gtgatggtgc gagccgtgtg gttctgagcc    420
tgccgttcgc ggaaggtagc agcagcgtgg agtacatcaa caactgggaa caagcgaaag    480
cgctgagcgt ggagctggaa attaacttcg aaacccgtgg caagcgtggc caggatgcga    540
tgtacgaata tatggcgcaa gcgtgcgcgg gtaaccgtgt gcgtcgtagc gttggtagca    600
gcctgagctg cattaacctg gattgggacg ttatccgtga caagaccaaa accaagatcg    660
aaagcctgaa agagcacggt ccgattaaaa acaagatgag cgagagcccg aacaagaccg    720
tgagcgagga aaaagcgaag cagtacctgg aggaatttca ccaaaccgcg ctggagcacc    780
cggaactgag cgagctgaaa accgtgaccg gcaccaaccc ggttttcgcg ggtgcgaact    840
atgcggcgtg ggcggtgaac gttgcgcagg tgatcgatag cgaaaccgcg gacaacctgg    900
aaaagaccac cgcggcgctg agcatcctgc cgggtattgg cagcgtgatg ggcatcgcgg    960
atggtgcggt tcaccacaac accgaggaaa tcgtggcgca gagcattgcg ctgagcagcc   1020
tgatggttgc gcaagcgatc ccgctggttg gtgagctggt tgacattggt ttcgcggcgt   1080
acaactttgt ggaaagcatc attaacctgt tccaggtggt tcacaacagc tacaaccgtc   1140
cggcgtatag cccgggccac aaaacccaac cgtttctgca cgatggttat gcggtgagct   1200
ggaacaccgt tgaggacagc atcattcgta ccggtttcca gggcgagagc ggtcacgata   1260
tcaagattac cgcggaaaac accccgctgc cgattgcggg cgttctgctg ccgaccattc   1320
cgggtaaact ggacgttaac aaaagcaaga cccacattag cgtgaacggc cgtaagatcc   1380
gtatgcgttg ccgtgcgatt gatggtgacg tgaccttttg ccgtccgaaa agcccggtgt   1440
acgttggtaa cggcgtgcac gcgaacctgc acgttgcgtt ccaccgtagc agcagcgaga   1500
agatccacag caacgaaatt agcagcgaca gcatcggcgt tctgggttat caaaaaaccg   1560
tggatcatac caaagtgaat agcaagctga gcctgttctt cgagattaaa agctctgagg   1620
tcttc                                                               1625
```

```
<210> SEQ ID NO 3
<211> LENGTH: 535
<212> TYPE: PRT
<213> ORGANISM: Artificial Sequence
<220> FEATURE:
<223> OTHER INFORMATION: Synthetic construct

<400> SEQUENCE: 3

Gly Ala Asp Asp Val Val Asp Ser Ser Lys Ser Phe Val Met Glu Asn
1               5                   10                  15

Phe Ser Ser Tyr His Gly Thr Lys Pro Gly Tyr Val Asp Ser Ile Gln
            20                  25                  30

Lys Gly Ile Gln Lys Pro Lys Ser Gly Thr Gln Gly Asn Tyr Asp Asp
        35                  40                  45

Asp Trp Lys Glu Phe Tyr Ser Thr Asp Asn Lys Tyr Asp Ala Ala Gly
    50                  55                  60

Tyr Ser Val Asp Asn Glu Asn Pro Leu Ser Gly Lys Ala Gly Gly Val
65                  70                  75                  80

Val Lys Val Thr Tyr Pro Gly Leu Thr Lys Val Leu Ala Leu Lys Val
                85                  90                  95

Asp Asn Ala Glu Thr Ile Lys Lys Glu Leu Gly Leu Ser Leu Thr Glu
            100                 105                 110

Pro Leu Met Glu Gln Val Gly Thr Glu Glu Phe Ile Lys Arg Phe Gly
        115                 120                 125
```

```
Asp Gly Ala Ser Arg Val Val Leu Ser Leu Pro Phe Ala Glu Gly Ser
    130                 135                 140

Ser Ser Val Glu Tyr Ile Asn Asn Trp Glu Gln Ala Lys Ala Leu Ser
145                 150                 155                 160

Val Glu Leu Glu Ile Asn Phe Glu Thr Arg Gly Lys Arg Gly Gln Asp
                165                 170                 175

Ala Met Tyr Glu Tyr Met Ala Gln Ala Cys Ala Gly Asn Arg Val Arg
            180                 185                 190

Arg Ser Val Gly Ser Ser Leu Ser Cys Ile Asn Leu Asp Trp Asp Val
        195                 200                 205

Ile Arg Asp Lys Thr Lys Thr Lys Ile Glu Ser Leu Lys Glu His Gly
    210                 215                 220

Pro Ile Lys Asn Lys Met Ser Glu Ser Pro Asn Lys Thr Val Ser Glu
225                 230                 235                 240

Glu Lys Ala Lys Gln Tyr Leu Glu Glu Phe His Gln Thr Ala Leu Glu
                245                 250                 255

His Pro Glu Leu Ser Glu Leu Lys Thr Val Thr Gly Thr Asn Pro Val
            260                 265                 270

Phe Ala Gly Ala Asn Tyr Ala Ala Trp Ala Val Asn Val Ala Gln Val
        275                 280                 285

Ile Asp Ser Glu Thr Ala Asp Asn Leu Glu Lys Thr Thr Ala Ala Leu
    290                 295                 300

Ser Ile Leu Pro Gly Ile Gly Ser Val Met Gly Ile Ala Asp Gly Ala
305                 310                 315                 320

Val His His Asn Thr Glu Glu Ile Val Ala Gln Ser Ile Ala Leu Ser
                325                 330                 335

Ser Leu Met Val Ala Gln Ala Ile Pro Leu Val Gly Glu Leu Val Asp
            340                 345                 350

Ile Gly Phe Ala Ala Tyr Asn Phe Val Glu Ser Ile Ile Asn Leu Phe
        355                 360                 365

Gln Val Val His Asn Ser Tyr Asn Arg Pro Ala Tyr Ser Pro Gly His
    370                 375                 380

Lys Thr Gln Pro Phe Leu His Asp Gly Tyr Ala Val Ser Trp Asn Thr
385                 390                 395                 400

Val Glu Asp Ser Ile Ile Arg Thr Gly Phe Gln Gly Glu Ser Gly His
                405                 410                 415

Asp Ile Lys Ile Thr Ala Glu Asn Thr Pro Leu Pro Ile Ala Gly Val
            420                 425                 430

Leu Leu Pro Thr Ile Pro Gly Lys Leu Asp Val Asn Lys Ser Lys Thr
        435                 440                 445

His Ile Ser Val Asn Gly Arg Lys Ile Arg Met Arg Cys Arg Ala Ile
    450                 455                 460

Asp Gly Asp Val Thr Phe Cys Arg Pro Lys Ser Pro Val Tyr Val Gly
465                 470                 475                 480

Asn Gly Val His Ala Asn Leu His Val Ala Phe His Arg Ser Ser Ser
                485                 490                 495

Glu Lys Ile His Ser Asn Glu Ile Ser Ser Asp Ser Ile Gly Val Leu
            500                 505                 510

Gly Tyr Gln Lys Thr Val Asp His Thr Lys Val Asn Ser Lys Leu Ser
        515                 520                 525

Leu Phe Phe Glu Ile Lys Ser
    530                 535
```

<210> SEQ ID NO 4
<211> LENGTH: 85
<212> TYPE: DNA
<213> ORGANISM: Artificial Sequence
<220> FEATURE:
<223> OTHER INFORMATION: Synthetic construct

<400> SEQUENCE: 4
ggtctcatat gaaatatctg ttaccgaccg ccgctgccgg actgctgtta ctggcggcgc 60
agccggcgat ggcgggcgag agacc 85

<210> SEQ ID NO 5
<211> LENGTH: 88
<212> TYPE: DNA
<213> ORGANISM: Artificial Sequence
<220> FEATURE:
<223> OTHER INFORMATION: Synthetic construct

<400> SEQUENCE: 5
ggtctcatat gaaaaaaagc ctggttctga aagcgtctgt tgcggtggcg acgctggtgc 60
cgatgctgtc gtttgccggc gagagacc 88

<210> SEQ ID NO 6
<211> LENGTH: 73
<212> TYPE: DNA
<213> ORGANISM: Artificial Sequence
<220> FEATURE:
<223> OTHER INFORMATION: Synthetic construct

<400> SEQUENCE: 6
ggtctcatat gcgttctgtg attgttgcct tcctgtttgc ctgtagcttt tgcgtgagcg 60
ccggcgagag acc 73

<210> SEQ ID NO 7
<211> LENGTH: 79
<212> TYPE: DNA
<213> ORGANISM: Artificial Sequence
<220> FEATURE:
<223> OTHER INFORMATION: Synthetic construct

<400> SEQUENCE: 7
ggtctcatat gcgtgcgaaa ctgctcggca ttgttctgac caccccgatt gccatttcca 60
gctttgccgg cgagagacc 79

<210> SEQ ID NO 8
<211> LENGTH: 82
<212> TYPE: DNA
<213> ORGANISM: Artificial Sequence
<220> FEATURE:
<223> OTHER INFORMATION: Synthetic construct

<400> SEQUENCE: 8
ggtctcatat gaaaaaaacc gccatcgcca ttgccgttgc cctcgctggc tttgccaccg 60
tggcgcaggc gggcgagaga cc 82

<210> SEQ ID NO 9
<211> LENGTH: 82
<212> TYPE: DNA
<213> ORGANISM: Artificial Sequence
<220> FEATURE:
<223> OTHER INFORMATION: Synthetic construct

<400> SEQUENCE: 9
ggtctcatat gaaactgctg aacgtgatca actttgtttt cctgatgttt gtcagcagca 60
gtagttttgc cggcgagaga cc 82

<210> SEQ ID NO 10
<211> LENGTH: 73
<212> TYPE: DNA
<213> ORGANISM: Artificial Sequence
<220> FEATURE:
<223> OTHER INFORMATION: Synthetic construct

<400> SEQUENCE: 10
ggtctcatat gaaaaaactg ctgtttgcca ttccgctggt tgtaccgttt tacagccaca 60
gcggcgagag acc 73

<210> SEQ ID NO 11
<211> LENGTH: 79
<212> TYPE: DNA
<213> ORGANISM: Artificial Sequence
<220> FEATURE:
<223> OTHER INFORMATION: Synthetic construct

<400> SEQUENCE: 11
ggtctcatat gaaagcgacg aaactggtgc tgggtgctgt gattctgggc agcacgctgc 60
tggcgggcgg cgagagacc 79

<210> SEQ ID NO 12
<211> LENGTH: 88
<212> TYPE: DNA
<213> ORGANISM: Artificial Sequence
<220> FEATURE:
<223> OTHER INFORMATION: Synthetic construct

<400> SEQUENCE: 12
ggtctcatat gaaaggtctg aataaaatta cctgctgttt actggcggcg ctgctgatgc 60
cgtgcgcggg tcatgcgggc gagagacc 88

<210> SEQ ID NO 13
<211> LENGTH: 22
<212> TYPE: PRT
<213> ORGANISM: Artificial Sequence
<220> FEATURE:
<223> OTHER INFORMATION: Synthetic construct

<400> SEQUENCE: 13

Met Lys Tyr Leu Leu Pro Thr Ala Ala Ala Gly Leu Leu Leu Leu Ala
1 5 10 15

Ala Gln Pro Ala Met Ala
20

<210> SEQ ID NO 14
<211> LENGTH: 23
<212> TYPE: PRT
<213> ORGANISM: Artificial Sequence
<220> FEATURE:
<223> OTHER INFORMATION: Synthetic construct

<400> SEQUENCE: 14

Met Lys Lys Ser Leu Val Leu Lys Ala Ser Val Ala Val Ala Thr Leu
1 5 10 15

Val Pro Met Leu Ser Phe Ala
20

-continued

```
<210> SEQ ID NO 15
<211> LENGTH: 18
<212> TYPE: PRT
<213> ORGANISM: Artificial Sequence
<220> FEATURE:
<223> OTHER INFORMATION: Synthetic construct

<400> SEQUENCE: 15

Met Arg Ser Val Ile Val Ala Phe Leu Phe Ala Cys Ser Phe Cys Val
1               5                   10                  15

Ser Ala


<210> SEQ ID NO 16
<211> LENGTH: 20
<212> TYPE: PRT
<213> ORGANISM: Artificial Sequence
<220> FEATURE:
<223> OTHER INFORMATION: Synthetic construct

<400> SEQUENCE: 16

Met Arg Ala Lys Leu Leu Gly Ile Val Leu Thr Thr Pro Ile Ala Ile
1               5                   10                  15

Ser Ser Phe Ala
            20


<210> SEQ ID NO 17
<211> LENGTH: 21
<212> TYPE: PRT
<213> ORGANISM: Artificial Sequence
<220> FEATURE:
<223> OTHER INFORMATION: Synthetic construct

<400> SEQUENCE: 17

Met Lys Lys Thr Ala Ile Ala Ile Ala Val Ala Leu Ala Gly Phe Ala
1               5                   10                  15

Thr Val Ala Gln Ala
            20


<210> SEQ ID NO 18
<211> LENGTH: 21
<212> TYPE: PRT
<213> ORGANISM: Artificial Sequence
<220> FEATURE:
<223> OTHER INFORMATION: Synthetic construct

<400> SEQUENCE: 18

Met Lys Leu Leu Asn Val Ile Asn Phe Val Phe Leu Met Phe Val Ser
1               5                   10                  15

Ser Ser Ser Phe Ala
            20


<210> SEQ ID NO 19
<211> LENGTH: 18
<212> TYPE: PRT
<213> ORGANISM: Artificial Sequence
<220> FEATURE:
<223> OTHER INFORMATION: Synthetic construct

<400> SEQUENCE: 19

Met Lys Lys Leu Leu Phe Ala Ile Pro Leu Val Val Pro Phe Tyr Ser
1               5                   10                  15

His Ser
```

<210> SEQ ID NO 20
<211> LENGTH: 20
<212> TYPE: PRT
<213> ORGANISM: Artificial Sequence
<220> FEATURE:
<223> OTHER INFORMATION: Synthetic construct

<400> SEQUENCE: 20

Met Lys Ala Thr Lys Leu Val Leu Gly Ala Val Ile Leu Gly Ser Thr
1 5 10 15

Leu Leu Ala Gly
20

<210> SEQ ID NO 21
<211> LENGTH: 23
<212> TYPE: PRT
<213> ORGANISM: Artificial Sequence
<220> FEATURE:
<223> OTHER INFORMATION: Synthetic construct

<400> SEQUENCE: 21

Met Lys Gly Leu Asn Lys Ile Thr Cys Cys Leu Leu Ala Ala Leu Leu
1 5 10 15

Met Pro Cys Ala Gly His Ala
20

<210> SEQ ID NO 22
<211> LENGTH: 34
<212> TYPE: DNA
<213> ORGANISM: Artificial Sequence
<220> FEATURE:
<223> OTHER INFORMATION: Synthetic construct

<400> SEQUENCE: 22
gcggatccaa gagacaggat gaggatcgtt tcgc 34

<210> SEQ ID NO 23
<211> LENGTH: 40
<212> TYPE: DNA
<213> ORGANISM: Artificial Sequence
<220> FEATURE:
<223> OTHER INFORMATION: Synthetic construct

<400> SEQUENCE: 23
cggatatcaa gcttggaaat gttgaatact catactcttc 40

<210> SEQ ID NO 24
<211> LENGTH: 30
<212> TYPE: DNA
<213> ORGANISM: Artificial Sequence
<220> FEATURE:
<223> OTHER INFORMATION: Synthetic construct

<400> SEQUENCE: 24
gagatccgga gcttatactg agctaataac 30

<210> SEQ ID NO 25
<211> LENGTH: 29
<212> TYPE: DNA
<213> ORGANISM: Artificial Sequence
<220> FEATURE:
<223> OTHER INFORMATION: Synthetic construct

<400> SEQUENCE: 25
gaaaaataaa caaaaacaaa aagagtttg 29

<210> SEQ ID NO 26
<211> LENGTH: 31
<212> TYPE: DNA
<213> ORGANISM: Artificial Sequence
<220> FEATURE:
<223> OTHER INFORMATION: Synthetic construct

<400> SEQUENCE: 26
tacaaactct ttttgttttt gtttattttt c 31

<210> SEQ ID NO 27
<211> LENGTH: 34
<212> TYPE: DNA
<213> ORGANISM: Artificial Sequence
<220> FEATURE:
<223> OTHER INFORMATION: Synthetic construct

<400> SEQUENCE: 27
cctgttatta gctcagtata agctccggat ctcg 34

<210> SEQ ID NO 28
<211> LENGTH: 26
<212> TYPE: DNA
<213> ORGANISM: Artificial Sequence
<220> FEATURE:
<223> OTHER INFORMATION: Synthetic construct

<400> SEQUENCE: 28
aattggagga acaatatgaa atatct 26

<210> SEQ ID NO 29
<211> LENGTH: 29
<212> TYPE: DNA
<213> ORGANISM: Artificial Sequence
<220> FEATURE:
<223> OTHER INFORMATION: Synthetic construct

<400> SEQUENCE: 29
aacatcgtca gcgcccgcca tcgccggct 29

<210> SEQ ID NO 30
<211> LENGTH: 27
<212> TYPE: DNA
<213> ORGANISM: Artificial Sequence
<220> FEATURE:
<223> OTHER INFORMATION: Synthetic construct

<400> SEQUENCE: 30
ttggaggaac aatatgaaaa aaagcct 27

<210> SEQ ID NO 31
<211> LENGTH: 30
<212> TYPE: DNA
<213> ORGANISM: Artificial Sequence
<220> FEATURE:
<223> OTHER INFORMATION: Synthetic construct

<400> SEQUENCE: 31
aacatcgtca gcgccggcaa acgacagcat 30

<210> SEQ ID NO 32
<211> LENGTH: 26
<212> TYPE: DNA
<213> ORGANISM: Artificial Sequence
<220> FEATURE:
<223> OTHER INFORMATION: Synthetic construct

<400> SEQUENCE: 32
ttggaggaac aatatgcgtt ctgtga 26

<210> SEQ ID NO 33
<211> LENGTH: 28
<212> TYPE: DNA
<213> ORGANISM: Artificial Sequence
<220> FEATURE:
<223> OTHER INFORMATION: Synthetic construct

<400> SEQUENCE: 33
aacatcgtca gcgccggcgc tcacgcaa 28

<210> SEQ ID NO 34
<211> LENGTH: 27
<212> TYPE: DNA
<213> ORGANISM: Artificial Sequence
<220> FEATURE:
<223> OTHER INFORMATION: Synthetic construct

<400> SEQUENCE: 34
ttggaggaac aatatgcgtg cgaaact 27

<210> SEQ ID NO 35
<211> LENGTH: 30
<212> TYPE: DNA
<213> ORGANISM: Artificial Sequence
<220> FEATURE:
<223> OTHER INFORMATION: Synthetic construct

<400> SEQUENCE: 35
aacatcgtca gcgccggcaa agctggaaat 30

<210> SEQ ID NO 36
<211> LENGTH: 25
<212> TYPE: DNA
<213> ORGANISM: Artificial Sequence
<220> FEATURE:
<223> OTHER INFORMATION: Synthetic construct

<400> SEQUENCE: 36
ttggaggaac aatatgaaaa aaacc 25

<210> SEQ ID NO 37
<211> LENGTH: 30
<212> TYPE: DNA
<213> ORGANISM: Artificial Sequence
<220> FEATURE:
<223> OTHER INFORMATION: Synthetic construct

<400> SEQUENCE: 37
aacatcgtca gcgcccgcct gcgccacggt 30

<210> SEQ ID NO 38
<211> LENGTH: 26
<212> TYPE: DNA
<213> ORGANISM: Artificial Sequence
<220> FEATURE:
<223> OTHER INFORMATION: Synthetic construct

<400> SEQUENCE: 38
ttggaggaac aatatgaaac tgctga 26

<210> SEQ ID NO 39

<211> LENGTH: 30
<212> TYPE: DNA
<213> ORGANISM: Artificial Sequence
<220> FEATURE:
<223> OTHER INFORMATION: Synthetic construct

<400> SEQUENCE: 39
aacatcgtca gcgccggcaa aactactgct 30

<210> SEQ ID NO 40
<211> LENGTH: 25
<212> TYPE: DNA
<213> ORGANISM: Artificial Sequence
<220> FEATURE:
<223> OTHER INFORMATION: Synthetic construct

<400> SEQUENCE: 40
ttggaggaac aatatgaaaa aactg 25

<210> SEQ ID NO 41
<211> LENGTH: 29
<212> TYPE: DNA
<213> ORGANISM: Artificial Sequence
<220> FEATURE:
<223> OTHER INFORMATION: Synthetic construct

<400> SEQUENCE: 41
acatcgtcag cgccgctgtg gctgtaaaa 29

<210> SEQ ID NO 42
<211> LENGTH: 28
<212> TYPE: DNA
<213> ORGANISM: Artificial Sequence
<220> FEATURE:
<223> OTHER INFORMATION: Synthetic construct

<400> SEQUENCE: 42
ttggaggaac aatatgaaag cgacgaaa 28

<210> SEQ ID NO 43
<211> LENGTH: 30
<212> TYPE: DNA
<213> ORGANISM: Artificial Sequence
<220> FEATURE:
<223> OTHER INFORMATION: Synthetic construct

<400> SEQUENCE: 43
aacatcgtca gcgccgcccg ccagcagcgt 30

<210> SEQ ID NO 44
<211> LENGTH: 27
<212> TYPE: DNA
<213> ORGANISM: Artificial Sequence
<220> FEATURE:
<223> OTHER INFORMATION: Synthetic construct

<400> SEQUENCE: 44
ttggaggaac aatatgaaag gtctgaa 27

<210> SEQ ID NO 45
<211> LENGTH: 30
<212> TYPE: DNA
<213> ORGANISM: Artificial Sequence
<220> FEATURE:
<223> OTHER INFORMATION: Synthetic construct

<400> SEQUENCE: 45
aacatcgtca gcgcccgcat gacccgcgca 30

<210> SEQ ID NO 46
<211> LENGTH: 27
<212> TYPE: DNA
<213> ORGANISM: Artificial Sequence
<220> FEATURE:
<223> OTHER INFORMATION: Synthetic construct

<400> SEQUENCE: 46
agccggcgat ggcgggcgct gacgatg 27

<210> SEQ ID NO 47
<211> LENGTH: 28
<212> TYPE: DNA
<213> ORGANISM: Artificial Sequence
<220> FEATURE:
<223> OTHER INFORMATION: Synthetic construct

<400> SEQUENCE: 47
atgctgtcgt ttgccggcgc tgacgatg 28

<210> SEQ ID NO 48
<211> LENGTH: 26
<212> TYPE: DNA
<213> ORGANISM: Artificial Sequence
<220> FEATURE:
<223> OTHER INFORMATION: Synthetic construct

<400> SEQUENCE: 48
ttgcgtgagc gccggcgctg acgatg 26

<210> SEQ ID NO 49
<211> LENGTH: 27
<212> TYPE: DNA
<213> ORGANISM: Artificial Sequence
<220> FEATURE:
<223> OTHER INFORMATION: Synthetic construct

<400> SEQUENCE: 49
tttccagctt tgccggcgct gacgatg 27

<210> SEQ ID NO 50
<211> LENGTH: 28
<212> TYPE: DNA
<213> ORGANISM: Artificial Sequence
<220> FEATURE:
<223> OTHER INFORMATION: Synthetic construct

<400> SEQUENCE: 50
accgtggcgc aggcgggcgc tgacgatg 28

<210> SEQ ID NO 51
<211> LENGTH: 28
<212> TYPE: DNA
<213> ORGANISM: Artificial Sequence
<220> FEATURE:
<223> OTHER INFORMATION: Synthetic construct

<400> SEQUENCE: 51
agcagtagtt ttgccggcgc tgacgatg 28

<210> SEQ ID NO 52
<211> LENGTH: 28
<212> TYPE: DNA

-continued

```
<213> ORGANISM: Artificial Sequence
<220> FEATURE:
<223> OTHER INFORMATION: Synthetic construct

<400> SEQUENCE: 52

ttttacagcc acagcggcgc tgacgatg                                    28


<210> SEQ ID NO 53
<211> LENGTH: 24
<212> TYPE: DNA
<213> ORGANISM: Artificial Sequence
<220> FEATURE:
<223> OTHER INFORMATION: Synthetic construct

<400> SEQUENCE: 53

tgctggcggg cggcgctgac gatg                                        24


<210> SEQ ID NO 54
<211> LENGTH: 26
<212> TYPE: DNA
<213> ORGANISM: Artificial Sequence
<220> FEATURE:
<223> OTHER INFORMATION: Synthetic construct

<400> SEQUENCE: 54

cgcgggtcat gcgggcgctg acgatg                                      26


<210> SEQ ID NO 55
<211> LENGTH: 36
<212> TYPE: DNA
<213> ORGANISM: Artificial Sequence
<220> FEATURE:
<223> OTHER INFORMATION: Synthetic construct

<400> SEQUENCE: 55

gatatccgct tttcattagc ttttaatctc gaagaa                           36


<210> SEQ ID NO 56
<211> LENGTH: 30
<212> TYPE: DNA
<213> ORGANISM: Artificial Sequence
<220> FEATURE:
<223> OTHER INFORMATION: Synthetic construct

<400> SEQUENCE: 56

ggcgcaagcg tgcgcgggta accgtgtgcg                                  30
```

CRM197 PROTEIN EXPRESSION METHOD

CROSS-REFERENCE TO RELATED APPLICATIONS

This is a United States national phase under 35 USC § 371 of International Patent Application No. PCT/KR2019/012899 filed Oct. 2, 2019, which in turn claims priority under 35 USC § 119 of Korean Patent Application No. 10-2019-0108892 filed Sep. 3, 2019. The disclosures of all such applications are hereby incorporated herein by reference in their respective entireties, for all purposes.

REFERENCE TO SEQUENCE LISTING SUBMITTED VIA EFS-WEB

This application includes an electronically submitted sequence listing in .txt format. The .txt file contains a sequence listing entitled "623_SeqListing_ST25.txt" created on Feb. 26, 2022 and is 20,820 bytes in size. The sequence listing contained in this .txt file is part of the specification and is hereby incorporated by reference herein in its entirety.

TECHNICAL FIELD

The present invention relates to a signal sequence for expressing a CRM197 protein in *E. coli* and secreting the CRM197 protein into the periplasm and the use thereof, and more specifically to a signal sequence for expressing a CRM197 protein, a nucleic acid encoding the signal sequence, a nucleic acid construct or expression vector comprising the nucleic acid and a CRM197 protein gene, a recombinant microorganism introduced with the nucleic acid construct or expression vector, and a method for producing the CRM197 protein comprising culturing the recombinant microorganism.

BACKGROUND ART

Diphtheria toxin (DT) is a proteinaceous exotoxin synthesized and secreted from a pathogenic strain of *Corynebacterium diphtheriae*. Diphtheria toxin is an ADP-ribosylating enzyme that is secreted as a proenzyme composed of 535 residues and separated into two fragments (fragments A and B) by treatment with a trypsin-like protease. Fragment A is a catalytically active area and is a NAD-dependent ADP-ribosyltransferase that specifically targets the protein synthesis factor EF-2, thus inactivating EF-2 and interrupting protein synthesis in cells.

CRM197 was found through the isolation of various non-toxic forms and partially toxic immunologically cross-reactive forms (CRM or cross-reactive substances) of diphtheria toxin (Uchida et al., *Journal of Biological Chemistry* 248, 3845-3850, 1973). Preferably, the CRM may have a predetermined size and composition comprising all or part of the DT.

CRM197 is an enzymatically highly inactive and non-toxic form of diphtheria toxin that contains a single amino acid substitution (G52E). This mutation imparts intrinsic flexibility to the active-site loop located in front of the NAD-binding site, thereby lowering the binding affinity of CRM197 to NAD and removing the toxicity of DT (Malito et al., *Proc. Natl. Acad. Sci. USA* 109 (14):5229-342012). CRM197, like DT, has two disulfide bonds. One disulfide bond links Cys186 to Cys201 to thereby link fragment A to fragment B. The other disulfide bond links Cys461 to Cys471 in fragment B. DT and CRM197 have nuclease activity derived from fragment A (Bruce et al., *Proc. Natl. Acad. Sci. USA* 87, 2995-8, 1990).

A number of antigens have low immunogenicity, especially in infants and young children, unless chemically linked to proteins, and are thus produced into conjugates or conjugate vaccines. In these conjugate vaccines, the protein component is also referred to as a "carrier protein". CRM197 is commonly used as a carrier protein in the protein-carbohydrate conjugation and hapten-protein conjugation. CRM197, as a carrier protein, has several advantages over diphtheria toxoid as well as other toxoid proteins (Shinefield Vaccine, 28:4335, 2010).

Methods for preparing diphtheria toxin (DT) are well known in the art. For example, DT may be produced by purification of the toxin from a culture of *Corynebacterium diphtheriae*, followed by chemical detoxification, or by purification of a recombinant or genetically detoxified analog of the toxin.

The abundance of proteins made it impossible to realize mass production of diphtheria toxins such as CRM197 for use in vaccines. This problem has previously been addressed by expression of CRM197 in *E. coli* (Bishai, et al., *J. Bacteriol.* 169:5140-5151), and Bishai et al. have reported a recombinant fusion protein containing a toxin (including tox signal sequence) leading to the production of degraded proteins.

Compared to cytoplasmic production, the production of bacterial toxins in the periplasm is characterized in that i) the protein is produced in a mature form after cleavage of the signal peptide, or ii) the periplasm of *E. coli* is an oxidizing environment that allows the formation of disulfide bonds, which can aid in the production of soluble, properly folded proteins, iii) the periplasm of *E. coli* contains less protease than the cytoplasm, which helps avoid proteolytic cleavage of expressed proteins, and iv) the periplasm also contains fewer proteins, which allows a recombinant protein to be obtained with higher purity.

In general, the presence of signal sequences on proteins facilitates transport (prokaryotic hosts) or secretion (eukaryotic hosts) of the proteins into the periplasm. In the prokaryotic hosts, the signal sequences coordinate newly formed proteins to the periplasm across the inner membrane and then are cleaved. That is, it is important to search for signal sequences capable of more efficiently mass-producing commercially essential proteins, and it is necessary to develop recombinant microorganisms.

Accordingly, as a result of extensive efforts to develop a method for producing the CRM197 protein in an efficient and cost-effective manner, the present inventors selected specific signal sequences, designed nucleotide sequences by combining the codon context with a secondary structure so as to optimize translation in *E. coli*, optimized expression in *E. coli* of CRM197 nucleotide sequences encoding the CRM197 protein, and found that CRM197 was efficiently expressed in *E. coli* and was efficiently secreted into the periplasm without pH change when these were used, thus completing the present invention.

The information disclosed in this Background section is provided only for better understanding of the background of the present invention, and therefore it may not include information that forms the prior art that is already obvious to those skilled in the art.

SUMMARY OF THE INVENTION

It is one object of the present invention to provide a signal sequence for expressing a CRM197 protein having a specific sequence, a nucleic acid encoding the signal sequence, and a method of producing a CRM197 protein using the nucleic acid in order to maximize expression of the CRM197 protein while minimizing the toxicity of the CRM197 protein to *E. coli* by secreting the CRM197 protein into the periplasm of *E. coli*.

In order to accomplish the objects, the present invention provides a signal sequence for expressing a CRM197 protein, represented by any one of amino acid sequences of SEQ ID NO: 13 to SEQ ID NO: 21.

The present invention also provides a nucleic acid encoding the signal sequence for expressing the CRM197 protein.

The present invention also provides a nucleic acid construct or expression vector comprising the nucleic acid and a gene of the CRM197 protein, a recombinant microorganism introduced with the nucleic acid construct or expression vector, and a method for producing a CRM197 protein comprising culturing the recombinant microorganism.

*rium* and CRM197 (solid line) produced by *E. coli* pHex-L3 had the same maximum emission wavelength of 338 nm.

DETAILED DESCRIPTION AND PREFERRED EMBODIMENTS OF THE INVENTION

Unless defined otherwise, all technical and scientific terms used herein have the same meanings as appreciated by those skilled in the field to which the present invention pertains. In general, the nomenclature used herein is well-known in the art and is ordinarily used.

In one embodiment of the present invention, 9 signal sequences were fused with a CRM197 protein to induce expression thereof. For each signal sequence, nucleotide sequences (SEQ ID NO: 4 to SEQ ID NO: 12) optimized for translation were designed in consideration of the codon context and the secondary structure of mRNA. These constructs were inserted into the expression plasmid pHex1.3, and the expression of CRM197 was observed in five *E. coli* strains to find the optimal *E. coli* strain for each construct. In addition, the culture temperature and the type and concentration of the inducer were set in the selected *E. coli*. As a result of transforming various *E. coli* strains with the constructs, the CRM197 protein could be expressed in a soluble form even in strains in which the genes (trxB, gor) related to the redox potential are not engineered, and could be secreted into the periplasm.

Thus, in one aspect, the present invention is directed to a signal sequence for expressing a CRM197 protein, represented by any one of amino acid sequences of SEQ ID NO: 13 to SEQ ID NO: 21.

In another aspect, the present invention is directed to a nucleic acid encoding the signal sequence for expressing the CRM197 protein.

In the present invention, the nucleic acid may be represented by any one of nucleotide sequences of SEQ ID NO: 4 to SEQ ID NO: 12, preferably represented by a nucleotide sequences of SEQ ID NO: 6 or SEQ ID NO: 8, but is not limited thereto.

As used herein, the term "signal sequence for expressing a CRM197 protein" means a signal sequence for expression of a CRM197 protein and secretion of the CRM197 protein into the periplasm.

In one embodiment of the present invention, the signal sequence of the protein targeted to the outer membrane of *E. coli* and the signal sequence derived from the M13 phage were selected (Table 3) in order to secrete the CRM197 protein into the periplasm. The nucleotide sequences (SEQ ID NO: 4 to SEQ ID NO: 12) were designed by combining the codon context with a secondary structure in order to optimize translation of the selected signal sequence in *E. coli.*

In another aspect, the present invention is directed to a nucleic acid construct comprising the nucleic acid encoding the signal sequence for expression of a CRM197 protein and a gene of the CRM197 protein.

In another aspect, the present invention is directed to an expression vector comprising the nucleic acid encoding the signal sequence for expressing a CRM197 protein and a gene of the CRM197 protein.

Figure 3:
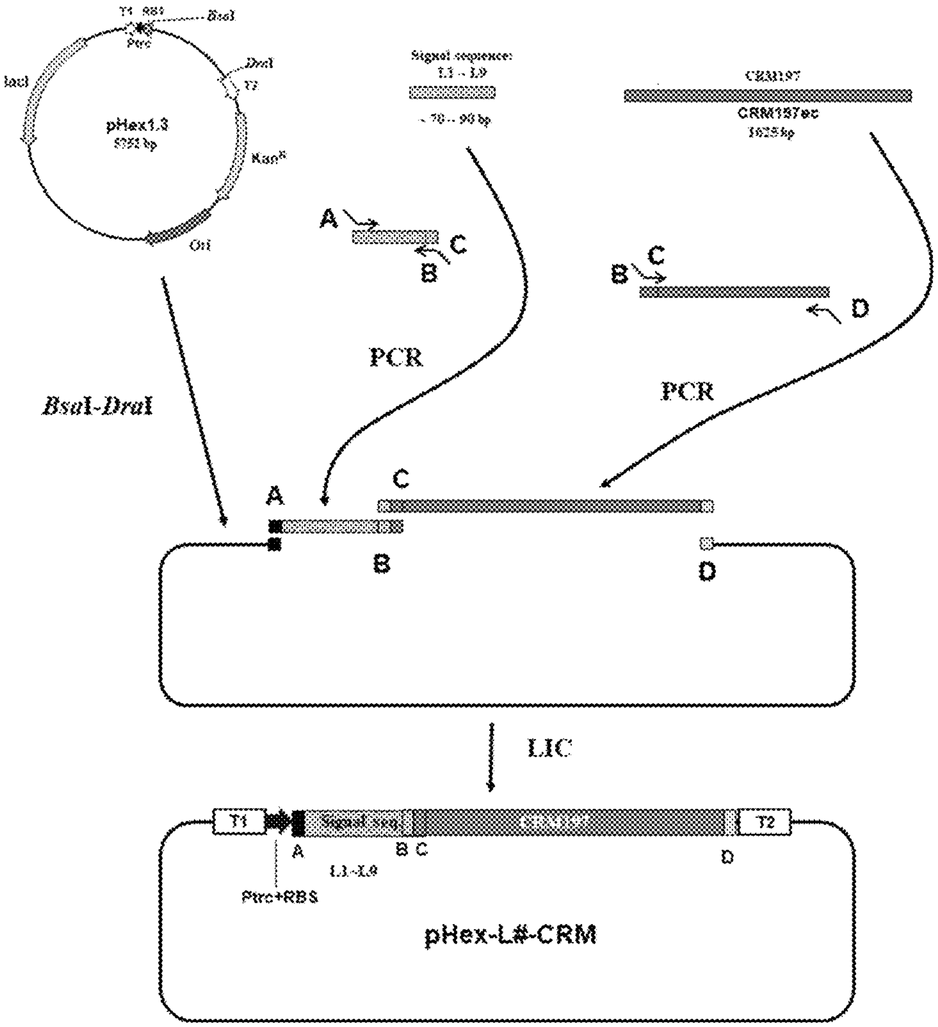
FIG. 3 is a schematic diagram illustrating production of the CRM197 expression plasmid, wherein T1 means a λtR2 & T7Te transcription terminator, T2 means rrnB $T_1T_2$ transcription terminators, arrows mean PCR primers, the alphabetic characters A, B, C and D mean homologous regions for LIC, and the remaining symbols are the same as in FIG. 1.

In one embodiment of the present invention, the DNA sequence coding the amino acid sequence of the CRM197 protein (SEQ ID NO: 3) was also optimized for *E. coli* expression (SEQ ID NO: 2). The DNA fragment of each designed signal sequence and the optimized CRM197 DNA fragment were inserted into the plasmid pHex1.3 (FIG. 3).

In the present invention, any CRM197 protein gene may be used without limitation, as long as it is a gene encoding a CRM197 protein. Preferably, the CRM197 protein gene may be represented by the nucleotide sequence of SEQ ID NO: 2, but is not limited thereto.

As used herein, the term "transformation" means introduction of a specific external DNA strand from outside the cells into the cells. A host microorganism comprising the introduced DNA strand is referred to as a "transformed microorganism". As used herein, the term 'transformation' meaning introducing DNA into a host and making the DNA replicable by an extrachromosomal factor or chromosomal integration indicates that a vector comprising a polynucleotide encoding a target protein is introduced into a host cell, or the polynucleotide encoding the target protein is integrated into the chromosome of the host cell to express the protein encoded by the polynucleotide in the host cell. The transformed polynucleotide comprises both a transformed polynucleotide inserted into and located inside the chromosome of the host cell and a transformed polynucleotide located outside the chromosome, so long as it can be expressed in the host cell.

As used herein, the term "nucleic acid construct" comprises both a nucleic acid construct inserted into and located inside the chromosome of the host cell and a nucleic acid construct located outside the chromosome, so long as it can be expressed in the host cell.

In addition, as used herein, the term "polynucleotide" is used interchangeably with the term "nucleic acid" and comprises DNA and RNA encoding a target protein. The polynucleotide may be introduced in any form so long as it can be introduced into a host cell and expressed therein. For example, the polynucleotide may be introduced into the host cell in the form of an expression cassette, which is a gene construct comprising all of the elements necessary for self-expression. The expression cassette typically comprises a promoter, a transcription termination signal, a ribosome-binding site and a translation termination signal, which is operably linked to the nucleic acid. The expression cassette may take an expression vector allowing for self-replication. The polynucleotide may also be introduced into the host cell in its native form and be operably linked to a sequence necessary for expression in the host cell.

As used herein, the term "vector" means a DNA product comprising a DNA sequence operably linked to a suitable regulatory sequence capable of expressing the DNA in a suitable host. The vectors may be plasmids, phage particles, or simple potential genomic inserts. When transformed into a suitable host, vectors may be replicated or perform functions independent of the host genomes, or some thereof may be integrated with the genomes. Plasmids are currently the most commonly used form of vector. Thus, the terms "plasmid" and "vector" are used interchangeably.

In consideration of the objects of the present invention, use of a plasmid vector is preferred. Typical plasmid vectors that can be used to accomplish the objects comprise (a) a replication origin to efficiently conduct replication so as to comprise several or several hundreds of plasmid vectors in each host cell, (b) an antibiotic resistance gene to screen host cells transformed with plasmid vectors, and (c) a restriction enzyme cleavage site into which a foreign DNA fragment is inserted. Even if an appropriate restriction enzyme cleavage site is not present, the vector and foreign DNA can be easily ligated using a synthetic oligonucleotide adaptor or a linker according to a conventional method.

Furthermore, when the gene is aligned with another nucleic acid sequence based on a functional relationship therebetween, it is said to be "operably linked" thereto. This may be gene(s) and regulatory sequence(s) linked in such a way so as to enable gene expression when a suitable molecule (e.g., a transcriptional activator protein) is linked to the regulatory sequence(s). For example, DNA for a pre-sequence or secretory leader is operably linked to DNA for a polypeptide when expressed as a preprotein involved in the secretion of the polypeptide; a promoter or enhancer is operably linked to a coding sequence when it affects the transcription of the sequence; a ribosome-binding site is operably linked to a coding sequence when it affects the transcription of the sequence; or the ribosome-binding site is operably linked to a coding sequence when positioned to facilitate translation.

Generally, the term "operably linked" means that the linked DNA sequence is in contact, or that a secretory leader is in contact therewith and is present in the reading frame. However, the enhancer need not be in contact therewith. The linkage of these sequences is carried out by ligation at convenient restriction enzyme sites. When no such site exists, a synthetic oligonucleotide adaptor or a linker according to a conventional method is used.

In the present invention, the expression vector may further comprise a Trc promoter.

In the present invention, the expression vector may be pHex1.3, but is not limited thereto.

Figure 1:
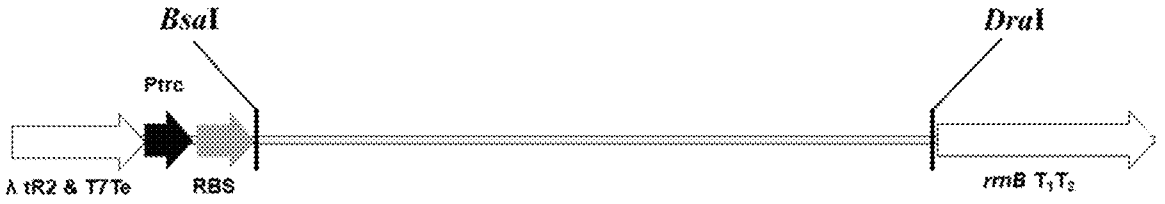
FIG. 1 is a schematic diagram illustrating an expression module, TPB1Tv1.3, wherein Ptrc means a trc promoter, RBS means A/U rich enhancer+SD, λtR2 & T7Te, and rrnB $T_1T_2$ mean transcription terminators, and BsaI and DraI mean restriction enzyme sites used for cloning.

CRM197 is known to be highly toxic to *E. coli* due to the nuclease activity thereof. Therefore, CRM197 expression under undesired conditions can adversely affect *E. coli* growth. The *E. coli* expression plasmid pHex1.3 has the LacI gene and can suppress background expression of the trc promoter, and the expression module TPB1Tv1.3 (FIG. 1) inserted into this plasmid is designed to suppress the expression of CRM197 transcribed from the plasmid-derived promoter by inserting a λ phage-derived tR2 transcription terminator and a T7 phage-derived Te transcription terminator into the upstream of the CRM197 gene to be expressed, and an *E. coli*-derived rrnB T1T2 transcription terminator into the downstream thereof.

In another aspect, the present invention is directed to a recombinant microorganism introduced with the nucleic acid construct or the expression vector.

In the present invention, the recombinant microorganism may be *Escherichia coli*, but is not limited thereto.

As the recombinant microorganism, host cells having high DNA introduction efficiency and high expression efficiency of the introduced DNA are commonly used, all of bacteria, yeast, mold, etc., that is, all microorganisms including prokaryotic and eukaryotic cells, are available, and in the example of the present invention, *E. coli* was used, but the present invention is not limited thereto, and any type of microorganism may be used as long as the CRM197 protein can be sufficiently expressed.

It should be understood that not all vectors function identically in expressing the DNA sequences of the present invention. Likewise, not all hosts function identically for the same expression system. However, those skilled in the art will be able to make appropriate selections from among various different vectors, expression regulatory sequences and hosts without excessive burden of experimentation and without departing from the scope of the present invention. For example, selection of a vector should be carried out in consideration of the host because the vector should be replicated therein. The number of times the vector replicates, the ability to control the number of times the vector replicates, and the expression of other proteins encoded by the corresponding vector, such as the expression of antibiotic markers, should also be considered.

The transformed recombinant microorganism may be prepared according to any known transformation method.

In the present invention, a method for inserting the gene into the chromosome of host cells may be selected from conventionally known genetic manipulation methods, for example, methods using retroviral vectors, adenovirus vectors, adeno-associated viral vectors, herpes simplex viral vectors, poxvirus vectors, lentiviral vectors, or non-viral vectors.

Also, the transformation may be performed by directly inserting the nucleic acid construct into the chromosome of host cells, in addition to using expression vectors.

In general, electroporation, lipofection, ballistic delivery, virosomes, liposomes, immunoliposomes, polycations or lipid:nucleic-acid conjugates, naked DNA, artificial virions, chemically promoted DNA influx, calcium phosphate ($CaPO_4$) precipitation, calcium chloride ($CaCl_2$) precipitation, microinjection, a lithium acetate-DMSO method, etc. may be used.

Sonoporation, for example, methods using a Sonitron 2000 system (Rich-Mar), may also be used for delivery of nucleic acids, and other representative nucleic acid delivery systems include Amaxa Biosystems (Cologne, Germany), Maxcyte, Inc. (Rockville, Maryland) and BTX Molecular System (Holliston, Mass.). Lipofection methods are disclosed in U.S. Pat. Nos. 5,049,386, 4,946,787, and 4,897,355, and lipofection reagents are commercially available, for example, TRANSFECTAM™ and LIPOFECTIN™. Cationic or neutral lipids suitable for effective receptor-recognition lipofection of polynucleotides include Felgner's lipids (WO91/17424 and WO91/16024), which may be delivered to cells through ex-vivo transduction and to target tissues through in-vivo transduction. Methods for preparing a lipid: nucleic-acid complex containing a target liposome, such as an immunolipid complex, are well known in the art (Crystal, *Science.*, 270:404-410, 1995; Blaese et al., *Cancer Gene Ther.*, 2:291-297, 1995; Behr et al., *Bioconjugate Chem.*, 5:382389, 1994; Remy et al., *Bioconjugate Chem.*, 5:647-654, 1994; Gao et al., *Gene Therapy.*, 2:710-722, 1995; Ahmad et al., *Cancer Res.*, 52:4817-4820, 1992; U.S. Pat. Nos. 4,186,183; 4,217,344; 4,235,871; 4,261,975; 4,485,054, 4,501,728; 4,774,085; 4,837,028; 4,946,787).

Figure 4:
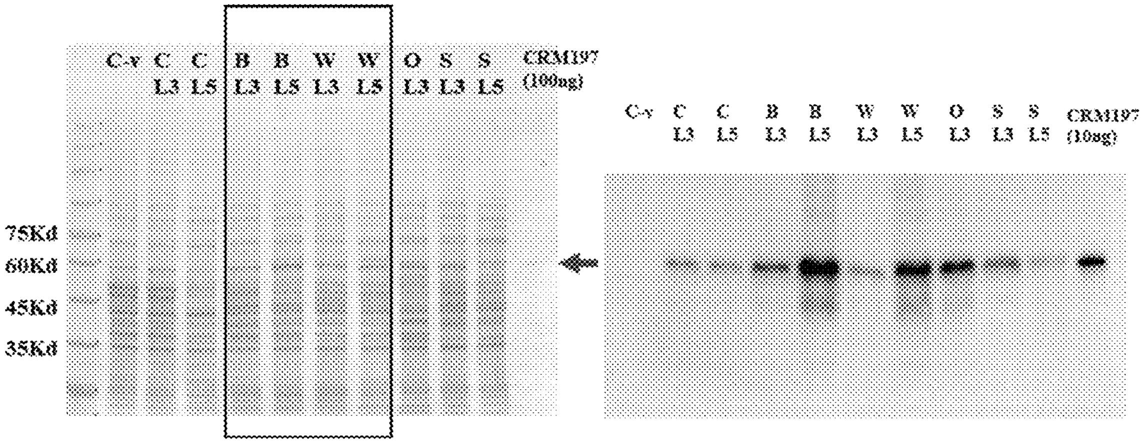
FIG. 4 illustrates the expression behaviors of L3 and L5 fusion CRM197 in various *E. coli* strains, and results of Coomassie staining (left) and Western blotting (right) after SDS-PAGE of total *E. coli* cells, wherein C means C2894H, B means BL21 (DE3), W means W3110-1, O means Origami™ 2, S means a shuffle, C-v represents C2984H containing pHex1.3 used as a negative control, L3 and L5 represent fused signal sequences, and CRM197 represents reference CRM197, and cells are loaded in each well at a density corresponding to $OD_{600}$ of 0.025 for Coomassie staining and at a density corresponding to $OD_{600}$ of 0.0005 for Western blotting.
Figure 7:
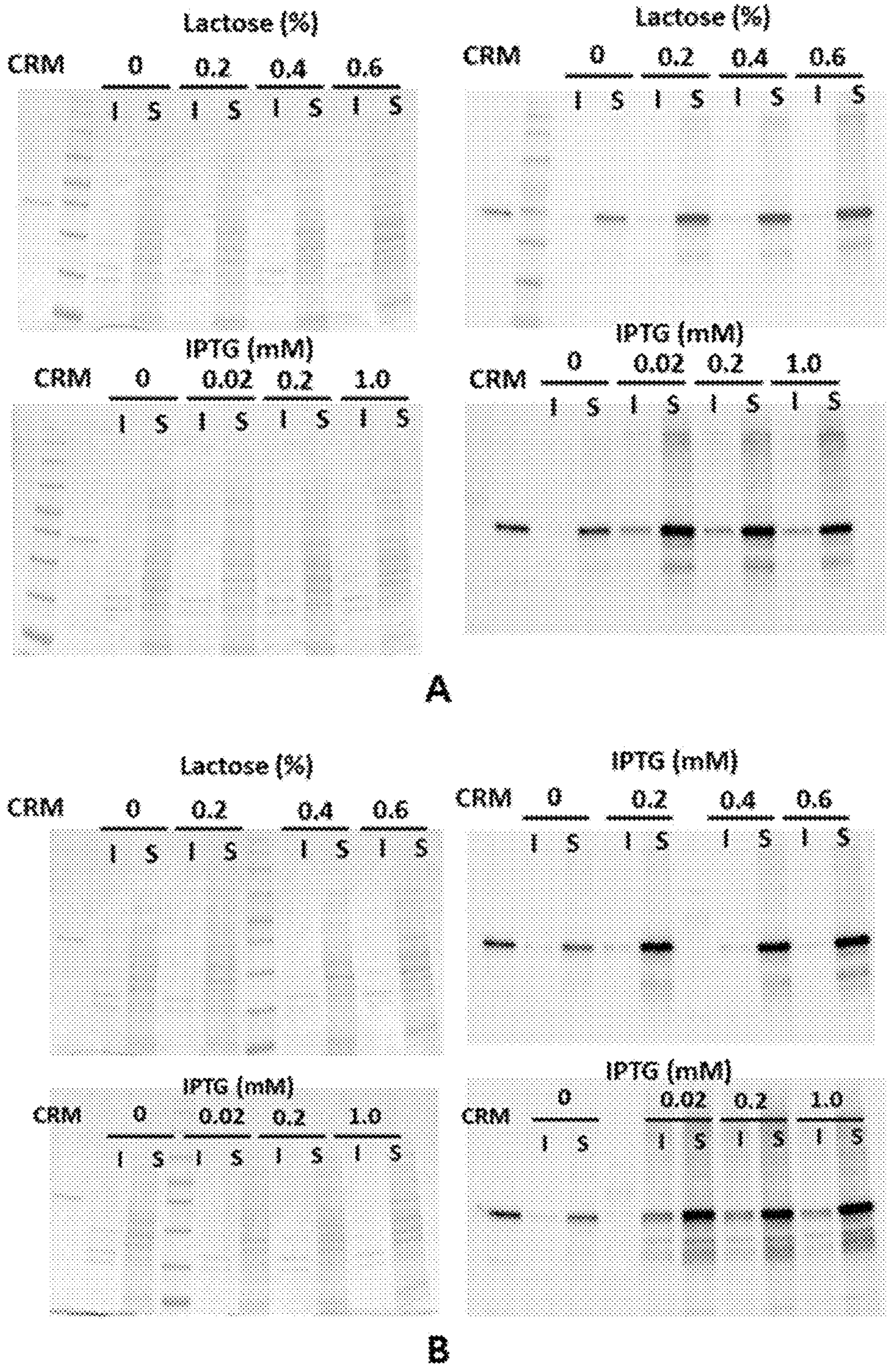
FIG. 7 illustrates the effects of the type and concentration of the inducer on the expression of CRM197 induced by L3, wherein (A) shows culture at 25° C. and (B) shows culture at 30° C.

In one embodiment of the present invention, as a result of transformation of various *E. coli* strains with the prepared plasmid vector (Table 4), for the L3 fusion, CRM197 was expressed in all strains, and for the L5 fusion, CRM197 was expressed in strains excluding Origami™ 2 (FIG. 4). Both the L3 and L5 fusions were capable of expressing the CRM197 protein in a soluble form even in strains in which the genes (trxB, gor) related to redox potential were not engineered, and the protein had the same physicochemical/immunological properties as the protein isolated from the parent strains. In addition, in the case of L3 fusion, CRM197 protein could be expressed in a soluble form at 25° C. as well as at 30° C. (FIGS. 7 and 12A).

Figure 12:
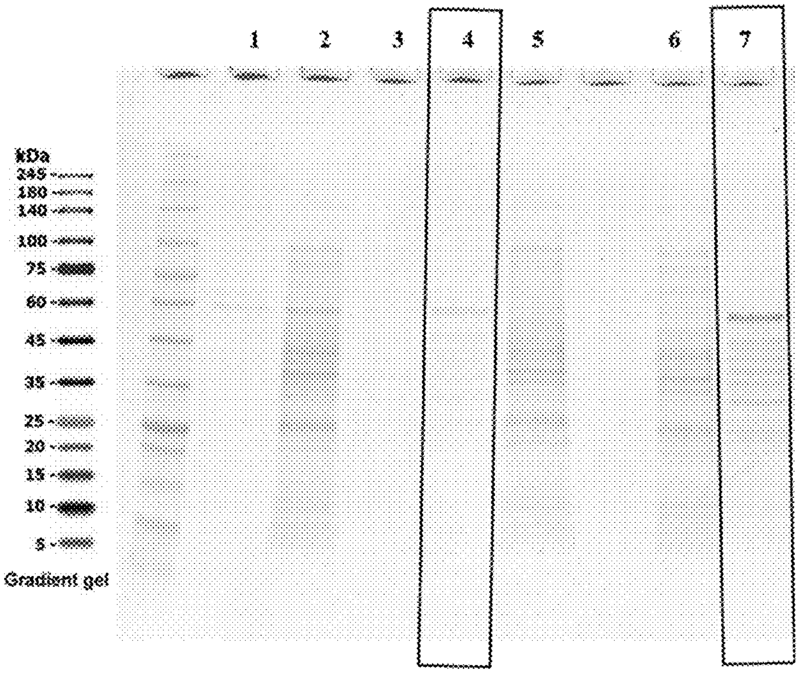
FIG. 12 illustrates the expression and separation behaviors of CRM197 protein in L3/L5 strains, wherein (A) illustrates the protein separation behavior in culture using L3, (B) illustrates the protein separation behavior in culture using L5, Line 1 was loaded with 200 ng of reference CRM197, line 2 is the total cell culture solution after completion of culture, line 3 is the supernatant after treatment with plasma membrane induction buffer, lines 4 and 7 are periplasmic fractions (line 7 being loaded with 4 times as much protein as line 4) and lines 5 and 6 represent cytoplasm fractions.
Figure 12:
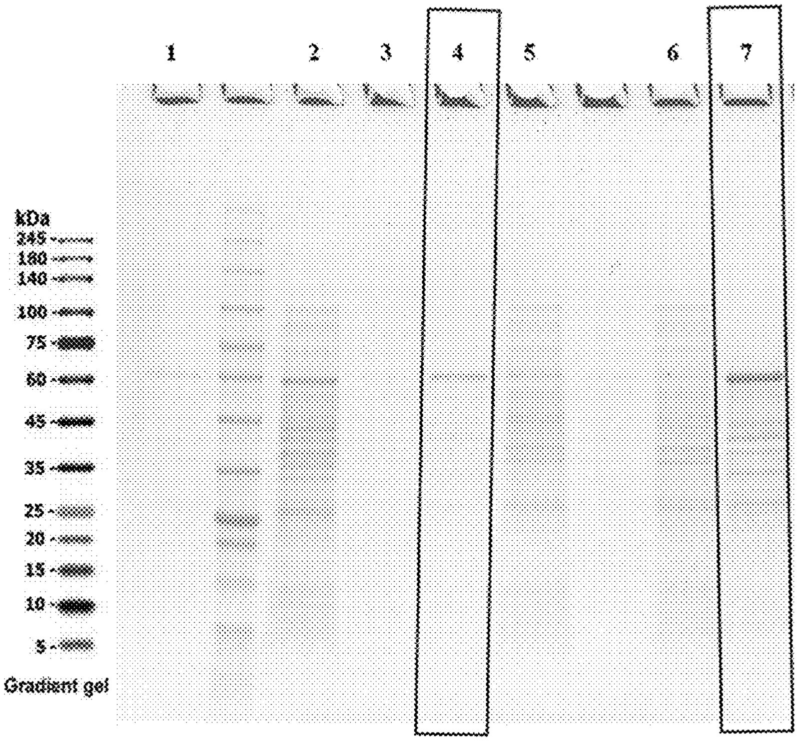

The previous report showed that when cultured at a pH of 6.5 to 6.8 and then shifted to pH 7.5 during induction, secretion of CRM197 into the periplasm is improved. In contrast, the strain prepared in the present invention was found to efficiently secrete CRM197 into the periplasm without a pH shift of the medium (FIG. 12). In the case of L5 fusion in high-concentration culture without pH shifting, the productivity of CRM197 was 3.7 g/L, and 2 g/L or more of CRM197 was secreted into the periplasm.

In another aspect, the present invention is directed to a method for producing a CRM197 protein comprising (a) culturing a recombinant microorganism introduced with the nucleic acid construct or the expression vector to produce a CRM197 protein, and (b) recovering the produced CRM197 protein.

In the present invention, step (b) may comprise recovering the CRM197 protein secreted into the periplasm.

Hereinafter, the present invention will be described in more detail with reference to examples. However, it will be obvious to those skilled in the art that these examples are provided only for illustration of the present invention and should not be construed as limiting the scope of the present invention.

Example 1: Preparation of CRM197 Overexpression Plasmid

Example 1.1: Construction of Plasmid pHex1.3

An *E. coli* expressing plasmid, pHex1.3, was prepared as follows. After double digestion of ptrc99a (Amann et al., Gene. 69, 301-15, 1988) with SspI and DraI, an about 3.2 kb DNA fragment was purified using agarose electrophoresis. The kanamycin resistant gene was amplified using PCR. The template used herein was plasmid pCR2.1, and the primers used herein were KF2 and KR (Table 1).

TABLE 1

PCR primers

| Primer | Nucleotide (5' -> 3') | sequence Template | Purpose | SEQ ID NO |
|---|---|---|---|---|
| KF2 | GCGGATCCAAGAGACAGGA TGAGGATCGTTTCGC | pCR2.1 | Amplification of Km gene | 22 |
| KR | CGGATATCAAGCTTGGAAA TGTTGAATACTCATACTCT TC | | | 23 |
| TPB_F | GAGATCCGGAGCTTATACT GAGCTAATAAC | TPB1Tv1.3 | Amplification of TPB1Tv1.3, | 24 |
| TPB_R | GAAAAATAAACAAAAACAA AAAGAGTTTG | | identification of insert | 25 |
| pHex_F | TACAAACTCTTTTTGTTTT TGTTTATTTTTC | pHex1.1 | Amplification of pHex1.1 | 26 |
| pHex_R | CCTGTTATTAGCTCAGTAT AAGCTCCGGATCTCG | | backbone | 27 |
| L1F | AATTGGAGGAACAATATGA AATATCT | L1 | Amplification of L1 signal | 28 |
| L1R | AACATCGTCAGCGCCCGCC ATCGCCGGCT | | seq. | 29 |
| L2F | TTGGAGGAACAATATGAAA AAAAGCCT | L2 | Amplification of L2 signal | 30 |
| L2R | AACATCGTCAGCGCCGGCA AACGACAGCAT | | seq. | 31 |
| L3F | TTGGAGGAACAATATGCGT TCTGTGA | L3 | Amplification of L3 signal | 32 |
| L3R | AACATCGTCAGCGCCGGCG CTCACGCAA | | seq. | 33 |
| L4F | TTGGAGGAACAATATGCGT GCGAAACT | L4 | Amplification of L4 signal | 34 |
| L4R | AACATCGTCAGCGCCGGCA AAGCTGGAAAT | | seq. | 35 |
| L5F | TTGGAGGAACAATATGAAA AAAACC | L5 | Amplification of L5 signal | 36 |
| L5R | AACATCGTCAGCGCCCGCC TGCGCCACGGT | | seq. | 37 |
| L6F | TTGGAGGAACAATATGAAA CTGCTGA | L6 | Amplification of L6 signal | 38 |
| L6R | AACATCGTCAGCGCCGGCA AAACTACTGCT | | seq. | 39 |
| L7F | TTGGAGGAACAATATGAAA AAACTG | L7 | Amplification of L7 signal | 40 |
| L7R | ACATCGTCAGCGCCGCTGT GGCTGTAAAA | | seq. | 41 |
| L8F | TTGGAGGAACAATATGAAA GCGACGAAA | L8 | Amplification of L8 signal | 42 |
| L8R | AACATCGTCAGCGCCGCCC GCCAGCAGCGT | | seq. | 43 |

TABLE 1-continued

| PCR primers | | | | |
|---|---|---|---|---|
| Primer | Nucleotide (5' -> 3') | sequence Template | Purpose | SEQ ID NO |
| L9F | TTGGAGGAACAATATGAAA GGTCTGAA | L9 | Amplification of L9 signal seq. | 44 |
| L9R | AACATCGTCAGCGCCCGCA TGACCCGCGCA | | | 45 |
| C1F | AGCCGGCGATGGCGGGCGC TGACGATG | CRM197ec | Amplification of CRM197 compatible with L1 | 46 |
| C2F | ATGCTGTCGTTTGCCGGCG CTGACGATG | CRM197ec | Amplification of CRM197 compatible with L2 | 47 |
| C3F | TTGCGTGAGCGCCGGCGCT GACGATG | CRM197ec | Amplification of CRM197 compatible with L3 | 48 |
| C4F | TTTCCAGCTTTGCCGGCGC TGACGATG | CRM197ec | Amplification of CRM197 compatible with L4 | 49 |
| C5F | ACCGTGGCGCAGGCGGGCG CTGACGATG | CRM197ec | Amplification of CRM197 compatible with L5 | 50 |
| C6F | AGCAGTAGTTTTGCCGGCG CTGACGATG | CRM197ec | Amplification of CRM197 compatible with L6 | 51 |
| C7F | TTTTACAGCCACAGCGGCG CTGACGATG | CRM197ec | Amplification of CRM197 compatible with L7 | 52 |
| C8F | TGCTGGCGGGCGGCGCTGA CGATG | CRM197ec | Amplification of CRM197 compatible with L8 | 53 |
| C9F | CGCGGGTCATGCGGGCGCT GACGATG | CRM197ec | Amplification of CRM197 compatible with L9 | 54 |
| C9R | GATATCCGCTTTTCATTAG CTTTTAATCTCGAAGAA | CRM197ec | Reverse primer for amplification of all CRM197 | 55 |
| crm_mconf | GGCGCAAGCGTGCGCGGGT AACCGTGTGCG | pHex-L#-CRM | Identification of insert | 56 |

The PCR reaction solution was prepared using 2.5 mM of each dNTP, 10 pmol of each primer, 200 to 500 ng of template DNA, 1.25 U of PrimeSTAR HS DNA Polymerase (Takara Bio Inc., Japan), and 50 μl of a reaction volume, and PCR was performed for 30 cycles, each comprising three steps at 98° C. for 10 seconds, at 60° C. for 5 seconds, and at 72° C. min/kb. After double digestion of about 0.8 kb DNA fragment produced under PCR conditions with BamHI and HindIII, the DNA fragment was filled-in with a klenow fragment to form a blunt end and then was ligated with the 3.2 kb DNA fragment prepared in the previous process using T4 DNA ligase. This reaction solution was transformed into *E. coli* C2984H to prepare pHex1.1 in which the selection marker was substituted from Amp to Km.

Figure 2:
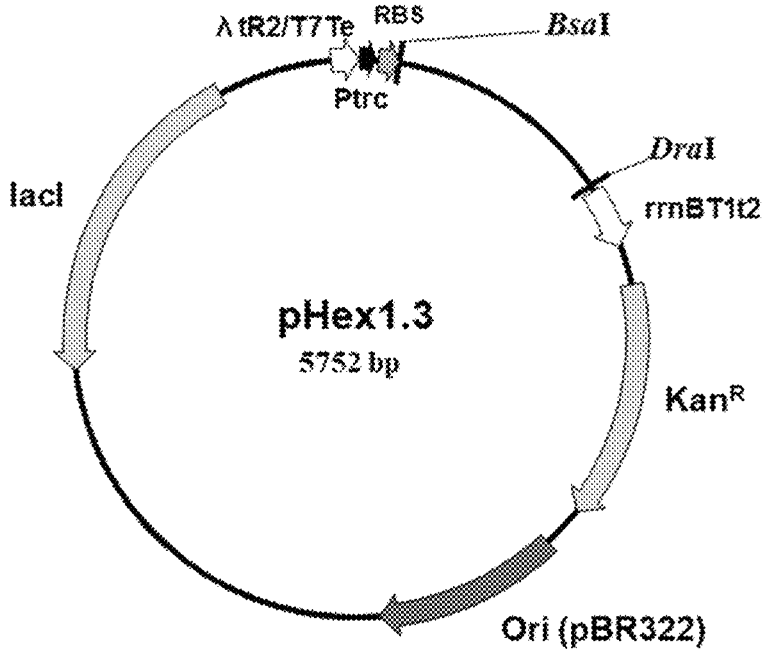
FIG. 2 illustrates an *E. coli* expression plasmid pHex1.3, wherein Ori (pBR322) means the origin of replication of pBR322, KanR means a kanamycin marker, lacI means a lacI gene, and the other symbols are the same as in FIG. 1.

The expression module TPB1Bv1.3, comprising promoters, RBS, and transcription terminators (FIG. 1), was synthesized in Bioneer (SEQ ID NO: 1). Process of loading the expression module TPB1Bv1.3 on pHex1.3 is as follows. A DNA fragment (1255 bp) obtained by PCR amplification using the expression module TPB1Bv1.3 as a template and TPB_F and TPB_R as primers (Table 1) was assembled in vitro with a DNA fragment (4561 bp) obtained through PCR amplification using pHex1.1 as a template and pHex_F and pHex_R as primers via ligation-independent cloning (LIC;

Jeong et al., *Appl Environ Microbiol.* 78, 5440-3, 2012) under the conditions shown in Table 2, and the resulting product was transformed into *E. coli* C2984H to prepare pHex1.3 (FIG. 2).

TABLE 2

| LIC reaction solution | Stock conc. |
|---|---|
| Linearized vector | 100 ng |
| Insert 1 | 40 ng |
| Insert 2 (if necessary) | 40 ng |
| T4 DNA polymerase(NEB) | 1U |
| $H_2O$ | Up to 10 μL |

LIC reaction conditions: The vectors were digested with restriction enzymes or were produced into linear DNA fragments through PCR. Inserts were prepared using PCR. The vectors were mixed with the inserts as shown in the table above, and then reacted at room temperature for 2 minutes and 30 seconds.

Example 1.2: Construction of CRM197 Gene

The nucleotide sequence (CRM197ec) of CRM197 optimally expressed in *E. coli* was synthesized in GenScript (SEQ ID NO: 2). The amino acid sequence coded by CRM197ec is SEQ ID NO: 3.

Example 1.3: Construction of Signal Sequence Gene

The signal sequences used to secrete the CRM197 protein into the periplasm of *E. coli* are shown in Table 3 below (SEQ ID NOS: 13 to 21). To optimize expression in *E. coli*, the DNA of SEQ ID NOS: 4 to 12 was synthesized in consideration of the codon context and secondary structure (Table 3).

TABLE 3

Signal sequences used in present invention

| Name | Description | Amino acid sequence | Nucleotide sequence (5' -> 3') |
|---|---|---|---|
| L1 | PelB signal sequence | MKYLLPTAAAGLLLLAAQPAMA (SEQ ID NO: 13) | GGTCTCATATGAAATATCTGTTACCGACCGCCGCTGCCGGACTGCTGTTACTGGCGGCGCAGCCGGCGATGGCGGGCGAGAGACC (SEQ ID NO: 4) |
| L2 | M13 G8 signal sequence | MKKSLVLKASVAVATLVPMLSFA (SEQ ID NO: 14) | GGTCTCATATGAAAAAAAGCCTGGTTCTGAAAGCGTCTGTTGCGGTGGCGACGCTGGTGCCGATGCTGTCGTTTGCCGGCGAGAGACC (SEQ ID NO: 5) |
| L3 | *E. coli* hypothetical protein (WP_001258047) signal sequence | MRSVIVAFLFACSFCVSA (SEQ ID NO: 15) | GGTCTCATATGCGTTCTGTGATTGTTGCCTTCCTGTTTGCCTGTAGCTTTTGCGTGAGCGCCGGCGAGAGACC (SEQ ID NO: 6) |
| L4 | *E. coli* OmpT signal sequence | MRAKLLGIVLTTPIAISSFA (SEQ ID NO: 16) | GGTCTCATATGCGTGCGAAACTGCTCGGCATTGTTCTGACCACCCCGATTGCCATTTCCAGCTTTGCCGGCGAGAGACC (SEQ ID NO: 7) |
| L5 | *E. coli OmpA* signal sequence | MKKTAIAIAVALAGFATVAQA (SEQ ID NO: 17) | GGTCTCATATGAAAAAAACCGCCATCGCCATTGCCGTTGCCCTCGCTGGCTTTGCCACCGTGGCGCAGGCGGGCGAGAGACC (SEQ ID NO: 8) |
| L6 | M13 G4 signal sequence | MKLLNVINFVFLMFVSSSSFA (SEQ ID NO: 18) | GGTCTCATATGAAACTGCTGAACGTGATCAACTTTGTTTTCCTGATGTTTGTCAGCAGCAGTAGTTTTGCCGGCGAGAGACC (SEQ ID NO: 9) |
| L7 | M13 G3 signal sequence | MKKLLFAIPLVVPFYSHS (SEQ ID NO: 19) | GGTCTCATATGAAAAAACTGCTGTTTGCCATTCCGCTGGTTGTACCGTTTTACAGCCACAGCGGCGAGAGACC (SEQ ID NO: 10) |
| L8 | *E. coli* Lpp signal sequence | MKATKLVLGAVILGSTLLAG (SEQ ID NO: 20) | GGTCTCATATGAAAGCGACGAAACTGGTGCTGGGTGCTGTGATTCTGGGCAGCACGCTGCTGGCGGGCGGCGAGAGACC (SEQ ID NO: 11) |

TABLE 3-continued

| Signal sequences used in present invention | | | |
|---|---|---|---|
| Name | Description | Amino acid sequence | Nucleotide sequence (5' -> 3') |
| L9 | *E. coli* GspD signal sequence | MKGLNKITCCLLAAL LMPCAGHA (SEQ ID NO: 21) | GGTCTCATATGAAAGGTCTGAA TAAAATTACCTGCTGTTTACTG GCGGCGCTGCTGATGCCGTGCG CGGGTCATGCGGGCGAGAGACC (SEQ ID NO: 12) |

EXAMPLE 1.4: Construction of Plasmid for CRM197 Overexpression

Plasmids for overexpressing CRM197 in *E. coli* and secreting the CRM197 into the periplasm were prepared as shown in FIG. 3. After double digestion of pHex1.3 with BsaI and DraI, a DNA fragment about 5 kb long was isolated using agarose electrophoresis. The signal sequences L1 to L9 were amplified by PCR using the primers and templates shown in Table 1. The CRM197 DNA fragment to fuse the CRM197 gene with each signal sequence using the LIC method was amplified by PCR using the primers and templates shown in Table 1. pHex1.3 digested with BsaI and DraI, each signal sequence fragment, and a CRM197 fragment compatible therewith were assembled in vitro using the LIC conditions described above, and then the resulting product was transformed into *E. coli* C2984H to prepare plasmids pHex-L1-CRM, pHex-L2-CRM, pHex-L3-CRM, pHex-L4-CRM, pHex-L5-CRM, pHex-L6-CRM, pHex-L7-CRM, pHex-L8-CRM and pHex-L9-CRM comprising CRM197 fused with respective signal sequences.

EXAMPLE 2: Expression of CRM197 Protein in *E. coli* pHex-L3-CRM and pHex-L5-CRM were selected from the plasmids prepared in Example 1, in consideration of the expression level and the degree of cell growth. After transformation of pHex-L3-CRM and pHex-L5-CRM into the *E. coli* strain of Table 4 below, the expression and expression position of the CRM197 protein were evaluated.

TABLE 4

| *E. coli* strains used in the present invention | | | | |
|---|---|---|---|---|
| | | Vendor | | Genotype |
| O | Origami ™ 2 | Novagen | K12 | Δ(ara-leu)7697 ΔlacX74 ΔphoAPvuIIphoR araD139 ahpCgalEgalKrpsL F'[lac+ lacIq pro] gor522::Tn10 trxB(CamR, StrR, TetR) |
| S | Shuffle | NEB | B | fhuA2 [lon] ompTahpC gal λatt::pNEB3-r1-cDsbC (SpecR, lacIq) ΔtrxBsulA11 R(mcr-73::miniTn10--TetS)2 [dcm] R(zgb-210::Tn10 --TetS) endA1 Δgor Δ(mcrC-mrr)114::IS10 |
| C | C2894H | NEB | K12 | F' proA+B+ lacIq ΔlacZM15/ fhuA2 Δ(lac-proAB) glnV galK16 galE15 R(zgb-210::Tn10)TetS endA1 thi-1 Δ(hsdS-mcrB) 5 |
| W | W3110-1 | KCTC | K12 | F- λ- rph-1 INV(rrnD, rrnE), ΔompT |
| B | BL21 (DE3) | | B | F- ompT gal dcmlonhsdSB (rB-mB-) λ(DE3 |

TABLE 4-continued

| *E. coli* strains used in the present invention | |
|---|---|
| Vendor | Genotype |
| | [lacI lacUV5-T7p07 ind1 sam7 nin5]) [malB+]K-12(λS) |

The culture method is as follows. The colony produced on a solid medium (10 g/L Soytone, 5 g/L yeast extract, 10 g/L NaCl, 15 g/L agar) was shaking-cultured in LB liquid medium containing 100 mM potassium phosphate (pH 7.5), km 50 μg/ml and 0.2% lactose, all cells were subjected to SDS-PAGE, and then CRM197 expression was analyzed using Coomassie staining and Western blotting (FIG. 4). For the L3 fusion, CRM197 protein was expressed in all strains used, whereas for the L5 fusion, growth was impossible in liquid medium when transformed into Origami™ 2. In other strains, CRM197 protein expression was observed.

Example 2.1: CRM197 Expression by L5

Figure 5:
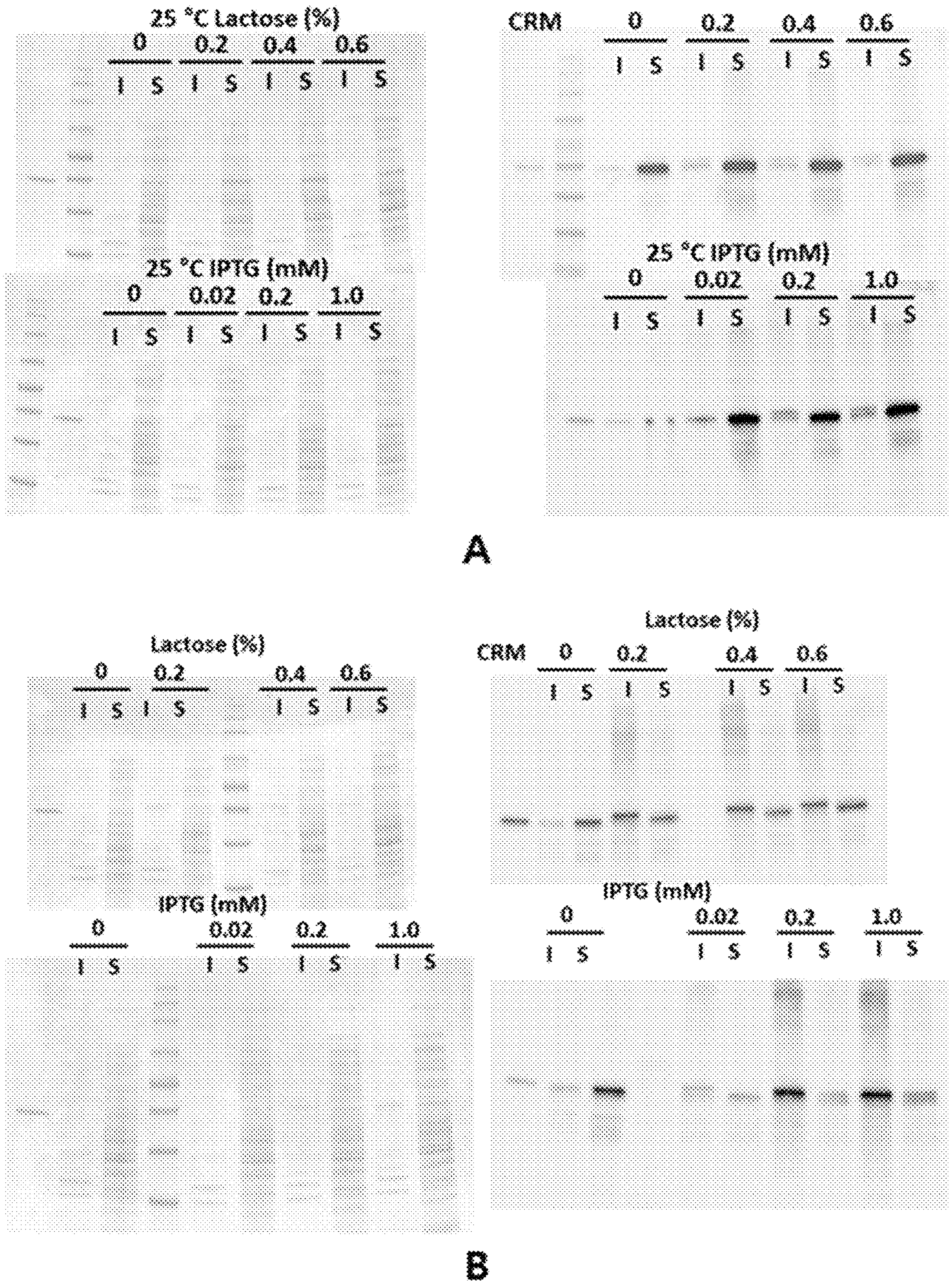
FIG. 5 illustrates the effects of the type and concentration of an inducer on the expression of CRM197 induced by L5, and illustrates the cases of Coomassie staining (left) and Western blotting (right) after SDS-PAGE, wherein the amounts of loaded cells are the same as in FIG. 4, I means an insoluble fraction, S means a soluble fraction, (A) shows culture at 25° C., and (B) shows culture at 30° C.

BL21 (DE3) containing pHex-L5-CRM was cultured in LB liquid medium (50 mL/500 mL baffled flask) containing 100 mM potassium phosphate (pH 7.5) and km 50 μg/ml until $OD_{600}$ reached 0.4 to 0.6. Then, 0.2, 0.4, or 0.6% lactose or 0.02, 0.2, or 2 mM IPTG (isopropyl β-D-1-thiogalactopyanosid) was added as an inducer to induce expression. The culture temperature was 25° C. or 30° C. After culturing, the cells were recovered, suspended in 50 mM potassium phosphate (pH 7.0), and then disrupted by sonication. After disruption, centrifugation was performed to separate the supernatant (soluble fraction) from the precipitate (insoluble fraction). After SDS-PAGE of each sample, expression of the CRM197 protein was analyzed using Coomassie staining and Western blotting (FIG. 5). When the inducer (lactose, IPTG) was added and culture was then performed at 25° C., most of the expressed CRM197 protein was present in a soluble form, and had the same molecular weight of the reference CRM197, which indicates that the expressed protein was mature CRM197 from which the L5 signal sequence was removed (FIG. 5A). On the other hand, when lactose was used as the inducer and culture was performed at 30° C., about 50% of the CRM197 protein was found in the insoluble fraction, and when IPTG was added as the inducer, most of the CRM197 protein was found in the insoluble fraction (FIG. 5B).

Figure 6:
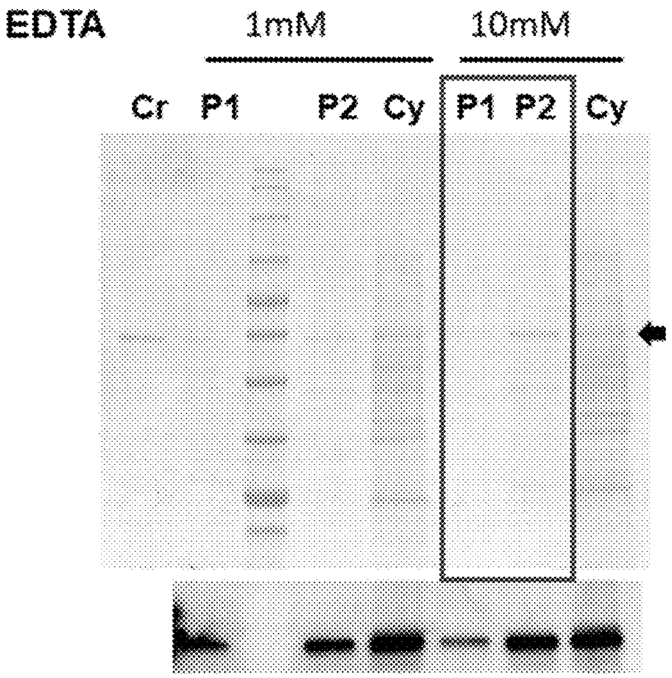
FIG. 6 illustrates the position of a CRM197 protein induced by L5 fusion, wherein the top shows Coomassie staining after SDS-PAGE, the bottom shows Western blotting, Cr represents reference CRM197, the arrow represents the position of matured CRM197, P1 means a supernatant obtained after treatment with plasma membrane induction buffer, P2 means a periplasmic fraction, and Cy means a cytoplasm fraction.

The periplasm fraction was recovered using osmotic shock to detect the location at which CRM197 was expressed. The process is as follows. BL21 (DE3) containing pHex-L5-CRM was cultured at 25° C. and then centrifuged to recover cells. The cells were resuspended in plasma membrane induction buffer [30 mM Tris-HCl (pH 8.0), 20% sucrose, 1 or 10 mM EDTA, 1 mM PMSF (phenylmethylsulfonyl fluoride)] until the cell concentration reached $OD_{600}$ of 10 and stirred at room temperature for 0.5 to 1 hour. Then, the cells were collected by centrifugation at 4,000×g for 15 minutes and added with the same amount of 30 mM cold (4° C. or lower) Tris-HCl (pH 8.0), followed by stirring at room temperature for 0.5 to 1 hour. Then, the cells were centrifuged at 4,000×g for 15 minutes to obtain the supernatant (periplasmic fraction, P2). After treatment with plasma membrane induction buffer, the supernatant (P1), periplasmic fraction (P2), and cytoplasm fraction were developed using SDS-PAGE, and then the expression of CRM197 and location of the expressed CRM197 were evaluated using Coomassie staining and Western blotting (FIG. 5). It was found that L5 can successfully secrete CRM197 into the periplasm (FIG. 6). EDTA as plasma membrane induction buffer was more effective at 10 mM than 1 mM.

Example 2.2: CRM197 Expression by L3

Figure 8:
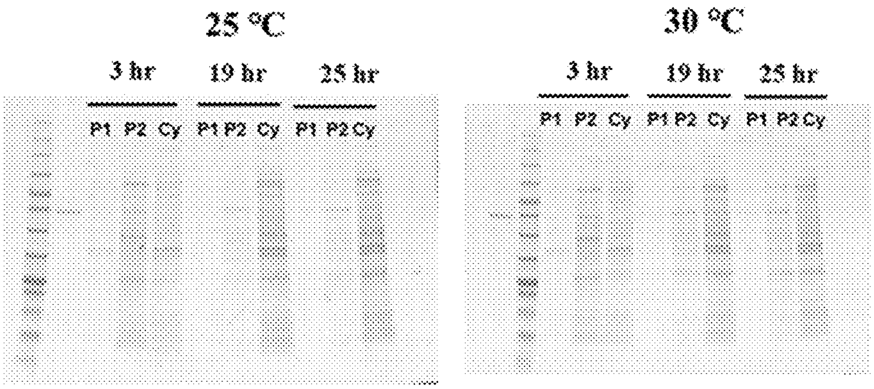
FIG. 8 shows the position of the CRM197 protein induced by L3 fusion.

BL21 (DE3) containing pHex-L3-CRM was expressed under the same conditions as in Example 2.1. It was found that the CRM197 induced by L3, unlike L5, was present in a soluble form under all conditions (FIG. 7), and was secreted into the periplasm (FIG. 8).

Example 3: Culture of *E. coli* BL21 (DE3)

The BL21 (DE3) strain containing pHex-L3-CRM or pHex-L5-CRM was cultured using the following method. During main culture, feeding was performed using a pH stat method, and the pH was maintained at 7.3 using a feeding solution (600 g/L glucose, 30 g/L yeast extract) and an alkali solution (14-15% ammonia). The compositions of solutions and media used for culture are shown in Tables 5 and 6.

TABLE 5

Composition of solutions and media used for culture in present invention

| | | Seed culture medium (/L) | Main culture medium (/L) | Feeding solution (/L) | pH adjustment |
|---|---|---|---|---|---|
| Casamino acids | | 20 g | 20 g | — | Using ammonia solution (14~15%) |
| Yeast extract | | 10 g | 10 g | 30 g | |
| $(NH_4)_2SO_4$ | | 7 g | 7 g | — | |
| $K_2HPO_4$ | | 2.5 g | 2.5 g | — | |
| NaCl | | 0.5 g | 0.5 g | — | |
| Trace metal (100x) | | 10 mL | 10 mL | — | |
| Glutamic acids | Added after auto-clave | 2 g | 2 g | — | |
| $CaCl_2•2H_2O$ | | 10 mg | 10 mg | — | |
| Glucose | | 15 g | 15 g | 600 g | |
| $MgSO_4•7H_2O$ | | 2.5 g | 2.5 g | — | |
| Km50 | | 1 mL | 1 mL | — | |
| SB2121 (anti foam) | | — | 0.1% | — | |
| | | pH adjustment to 7.3 (using 1~4M NaOH) | | | |

TABLE 6

Composition of trace metal used for culture of present invention

| | Trace metal (100x, /L) |
|---|---|
| EDTA | 840 mg |
| $CoCl_2•6H2O$ | 250 mg |
| $MnCl_2•4H_2O$ | 1.5 g |
| $CuC1_2•2H_2O$ | 150 mg |
| $H_3BO_3$ | 300 mg |
| $Na_2MoO_4•2H_2O$ | 250 mg |
| $Zn(CH_3COO)_2•2H_2O$ | 1.3 g |
| Fe (III) citrate | 10 g |

A single colony formed in modified LB agar medium [modified Luria-Bertani (LB) agar: 10 g/L soytone, 5 g/L yeast extract, 10 g/L sodium chloride, 15 g/L agar, 50 mg/L kanamycin] was inoculated into a seed culture medium, followed by incubation at 30° C. for 18 hours. The resulting seed culture was again inoculated at a ratio of 1% (v/v) in a main culture medium (3L/5L fermenter) and cultured at 30° C. The main culture medium was obtained by adding 0.1% of a sterilized antifoaming agent to the seed culture medium. After the absorbance of the culture solution reached 30-40, the temperature was lowered to 25° C. Then, 10 mM IPTG was added and the culture was terminated after the absorbance of the culture solution reached 100~120.

Figure 9:
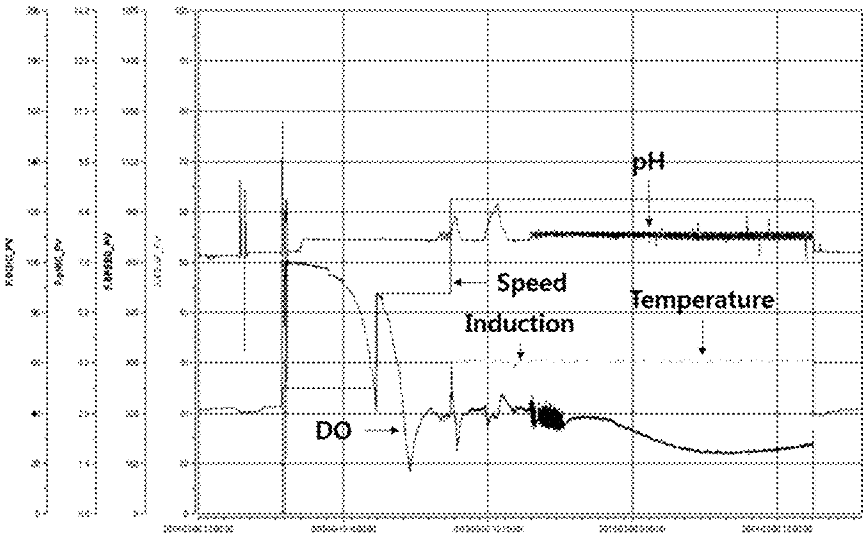
FIG. 9 shows changes in pH of the L3 strain, temperature, impeller speed and dissolved oxygen (DO), and the addition time of the expression inducer, wherein (A) shows the case in which the temperature is maintained at 30° C., and (B) shows the case in which the temperature is lowered to 25° C. before expression induction.
Figure 9:
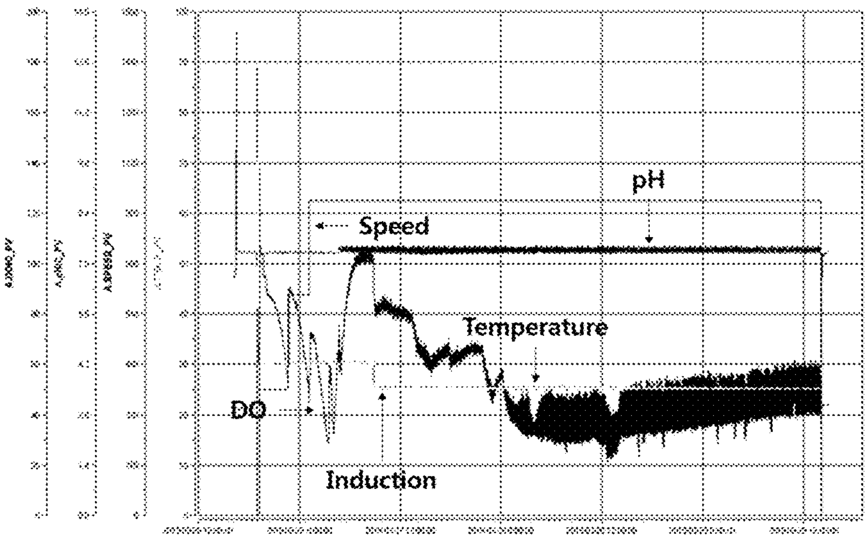
Figure 10:
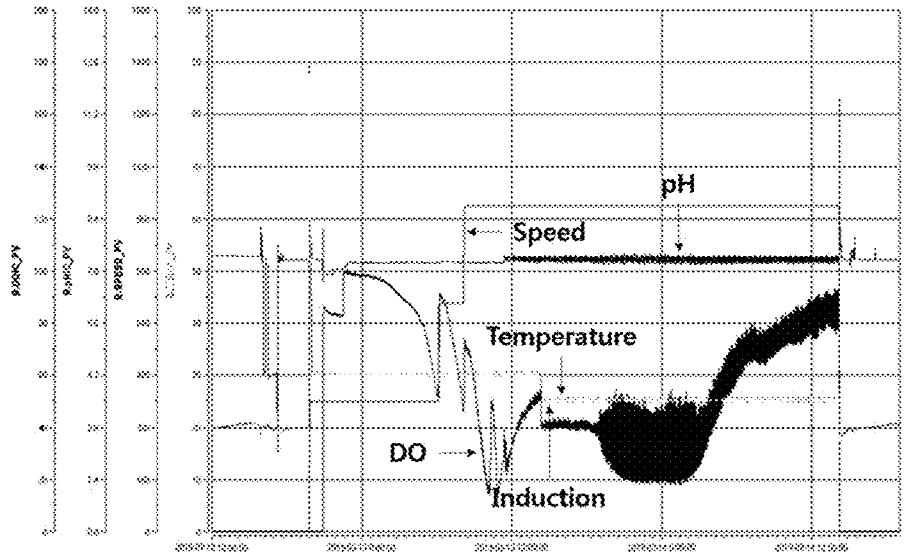
FIG. 10 shows changes in pH of the L5 strain, temperature, impeller speed and dissolved oxygen (DO) and the addition time of the expression inducer.
Figure 11:
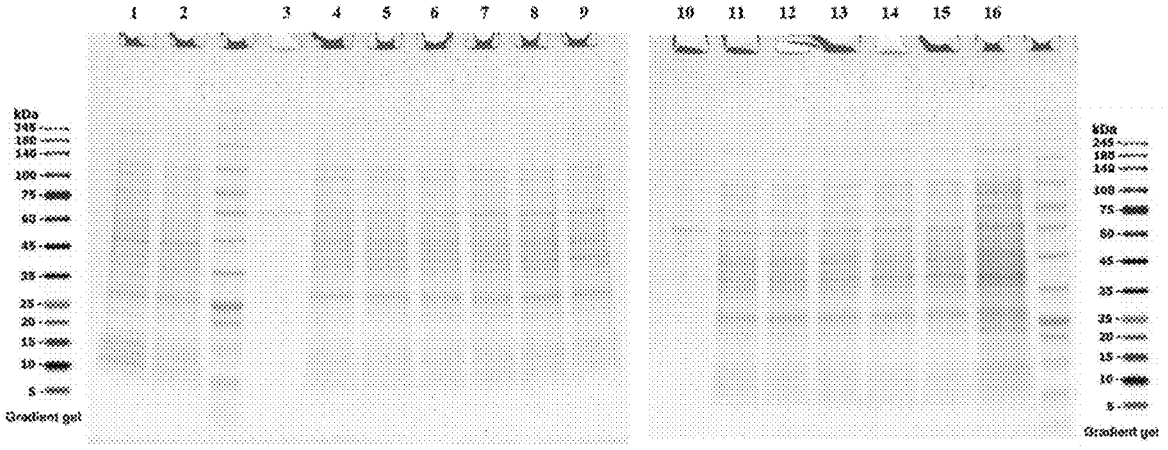
FIG. 11 shows the change in CRM197 protein expression before and after addition of the expression inducer during culture, wherein (A) shows expression of the L3 strain induced at 30° C., (B) shows expression of the L3 strain induced at 25° C., (C) shows expression of the L5 strain induced at 25° C. 200 ng of reference CRM197 was loaded in lines 3 and 10 in (A), lines 4 and 10 in (B), and lines 3 and 9 in (C). Lines 1 and 2 in (A), lines 1, 2 and 3 in (B), and lines 1 and 2 in (C) are cell culture solutions before addition of the expression inducer and line 16 in (A) and line 16 (C) are supernatants after completion of culture, the subsequent lines are cell culture solutions sampled every 2 hours after addition of the inducer. The amount of loading is the same as in FIG. 4.
Figure 11:
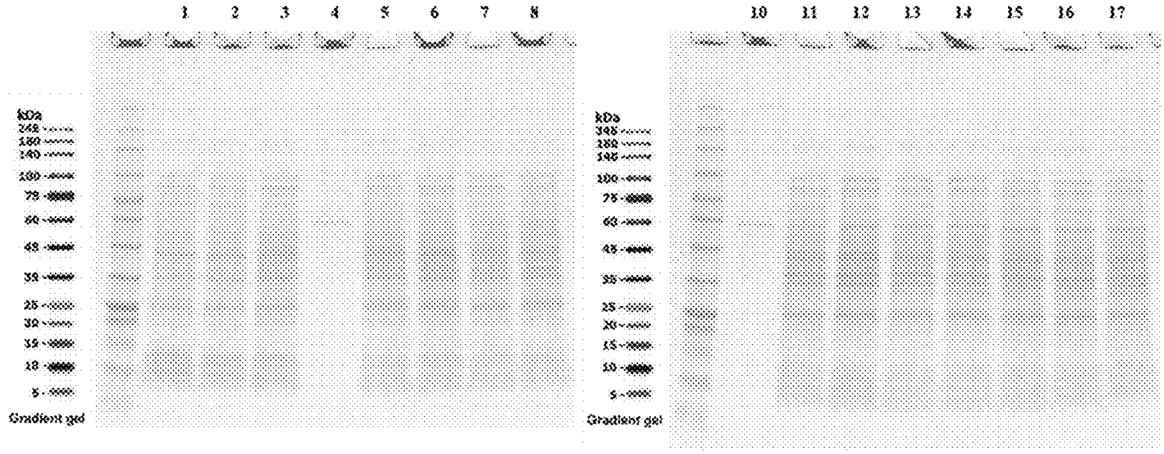
Figure 11:
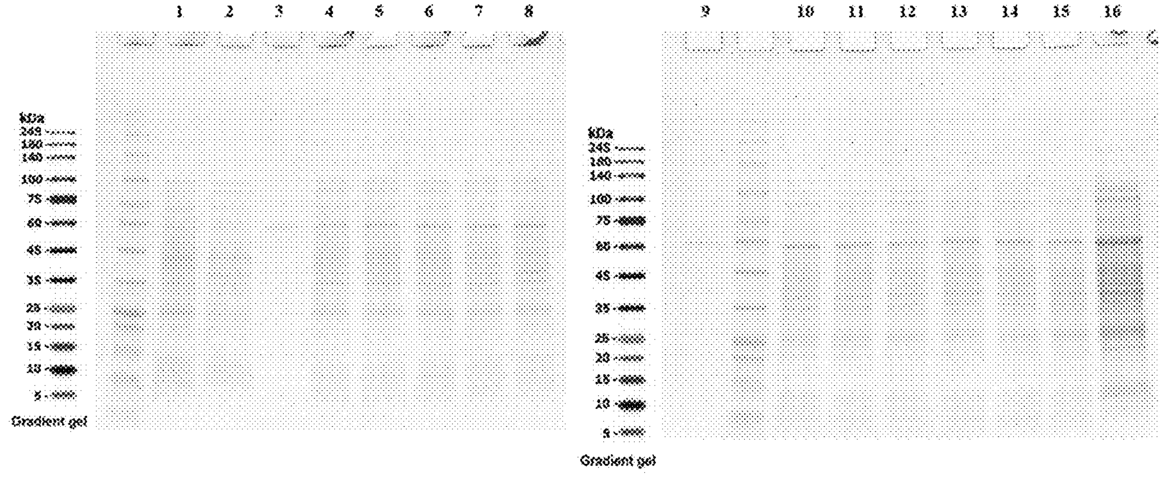

The culture behavior of *E. coli* BL21 (DE3) containing pHex-L3-CRM in a 5L fermenter is shown in FIG. 9, and the culture behavior of *E. coli* BL21 (DE3) containing pHex-L5-CRM is shown in FIG. 10. The expression behavior of CRM197 upon fermentation in a 5L fermenter is shown in FIG. 11, and the expression yield was 1.1 to 1.2 g/L for L3 fusion and 3.0 to 3.7 g/L for L5 fusion. The quantity of CRM197 was measured by comparing the relative quantity with reference CRM197 using a densitometer (GS-900™, Bio-Rad laboratories Ins., Hercules, California) after SDS-PAGE/Coomassie staining.

Example 4: Protein Purification

Example 4.1: Production of Periplasmic Fraction from Cell Culture

The procedure for recovering the periplasmic fraction from cells cultured in a 5L fermenter is as follows. The cell culture medium was centrifuged at 4° C. and 4,000×g for 15 minutes to precipitate cells. The cell precipitate was resuspended in a plasma membrane induction buffer (Table 7) of protein modified based on an absorbance of 100 and stirred at room temperature for 0.5 to 1 hour.

TABLE 7

Composition of buffer solution used for preparation of periplasmic fraction of present invention

| | Periplasting buffer | Shock buffer (cold) |
|---|---|---|
| Tris-HCl (pH 8.0) | 30 mM | 30 mM |
| Sucrose | 20% | — |
| EDTA | 10 mM | — |
| PMSF | 1 mM | — |

Then, the cells were collected by centrifugation at 4,000×g for 15 minutes and were added with the same amount of 30 mM cold (at 4° C. or less) Tris-HCl (pH 8.0), followed by stirring at room temperature for 0.5 to 1 hour. Then, the cells were centrifuged at 4,000×g for 15 minutes to obtain the supernatant, and impurities were removed using MF. SDS-PAGE analysis of the periplasmic fraction recovered from *E. coli* BL21 (DE3) containing pHex-L3-CRM through the process described above is shown in FIG. 12 (A), and SDS-PAGE analysis of the periplasmic fraction recovered from *E. coli* BL21 (DE3) containing pHex-L5-CRM is shown in FIG. 12(B). The amount of CRM197 protein present in the periplasmic fraction was found to be 1.2 g/L for the L3 strain and 2.3 g/L for the L5 strain (Table 8).

TABLE 8

Amount of CRM197 protein obtained through culture of present invention

| | L3 | | L5 | | | Periplasm | |
|---|---|---|---|---|---|---|---|
| | batch #1 | batch #2 | batch #1 | batch #2 | batch #3 | L3_#2 | L5_#1 |
| Final $OD_{600}$ | 109.4 | 118 | 119.8 | 107 | 112 | 100 | 100 |
| Total CRM (g/L) | 1.18 | 1.06 | 3.74 | 2.95 | 3.74 | 1.18 | 2.30 |

Example 4.2: Purification of CRM197 Protein

Figure 13:
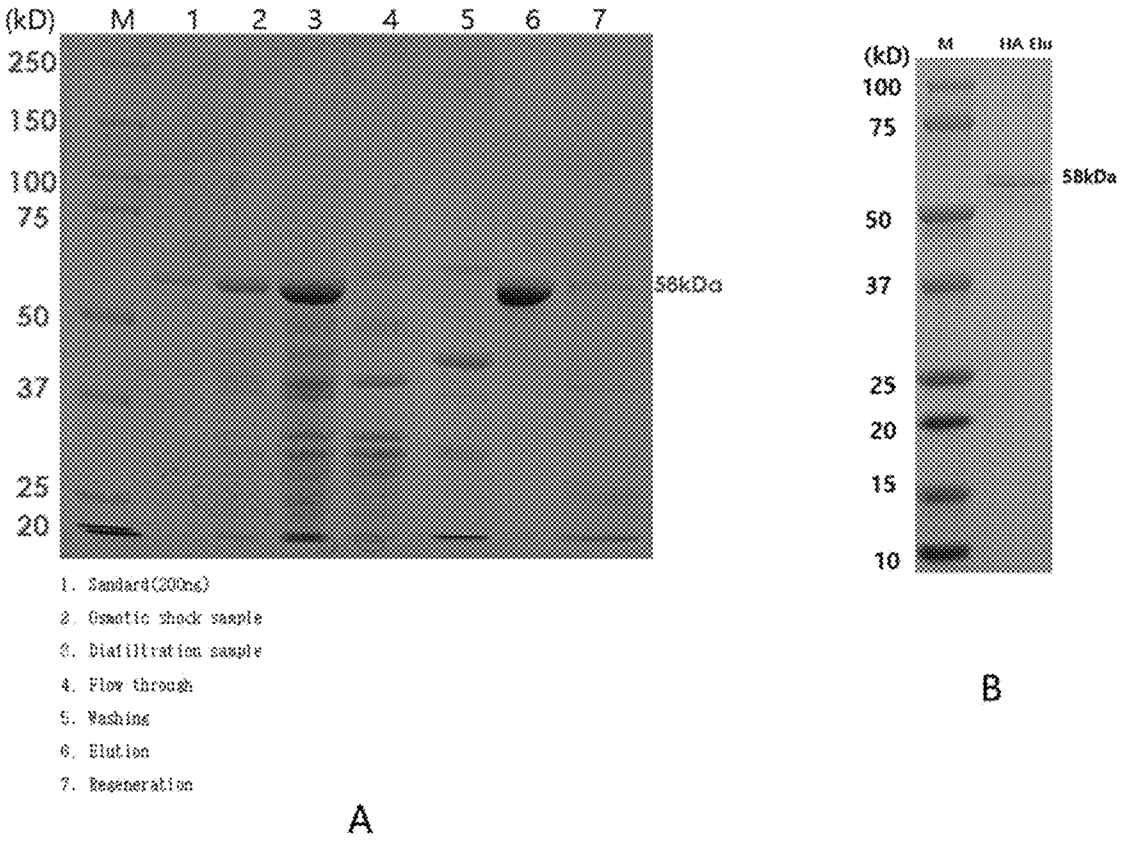
FIG. 13 illustrates the result of SDS-PAGE of samples purified through DEAE chromatography (A) and HA chromatography (B). In (A), line 1 means CRM197 produced by *Corynebacterium*, line 2 means the protein present in the recovered periplasmic fraction, line 3 means the sample before loading in DEAE chromatography, which is concentrated twice after ultrafiltration, lines 4 and 5 are used to detect impurity proteins excluding CRM197 using a flow-through mode of DEAE chromatography and washing solutions, line 6 is an eluted sample from which impurities have been removed, line is a sample eluted using a high-concentration salt to remove all proteins bound to the resin. HA Elu in (B) is CRM197 eluted after removing the protein not bound to the HA resin.

The periplasmic fraction of the pHex-L3-CRM culture medium was concentrated twice with a 10 kDa cut-off membrane using a TFF system, and ultrafiltration was performed using ten volumes of 10 mM sodium phosphate solvent (pH 7.2). Purification was completed through two column processes using an AKTA pure (GE Healthcare) system. The first column process was anion exchange chromatography (diethyl aminoethyl Sepharose fast flow resin, DEAE), and was used to remove nucleic acids and impurity proteins. The DEAE resin is negatively charged (−) and is bound with a positively charged (+) protein. Unbound proteins and impurities were primarily extracted and removed from the ultra-filtered sample through DEAE chromatography, and then impure proteins with low binding ability, excluding CRM197, were removed through a subsequent washing process based on the salt concentration. Then, only CRM197 was eluted by increasing the salt concentration. SDS-PAGE analysis was performed on the sample during the purification process using DEAE chromatography, and the results are shown in FIG. 13(A). First, unbound impurities and proteins were primarily removed in a flow-through manner from the sample subjected to DEAE chromatography using hydroxyapatite (HA) chromatography, and CRM197 was eluted with 100 mM potassium phosphate and 100 mM NaCl solvents. The result of SDS-PAGE of the eluted CRM197 is shown in FIG. 13(B).

Example 5: Comparison with CRM197 Produced Using *Corynebacterium*

Figure 14:
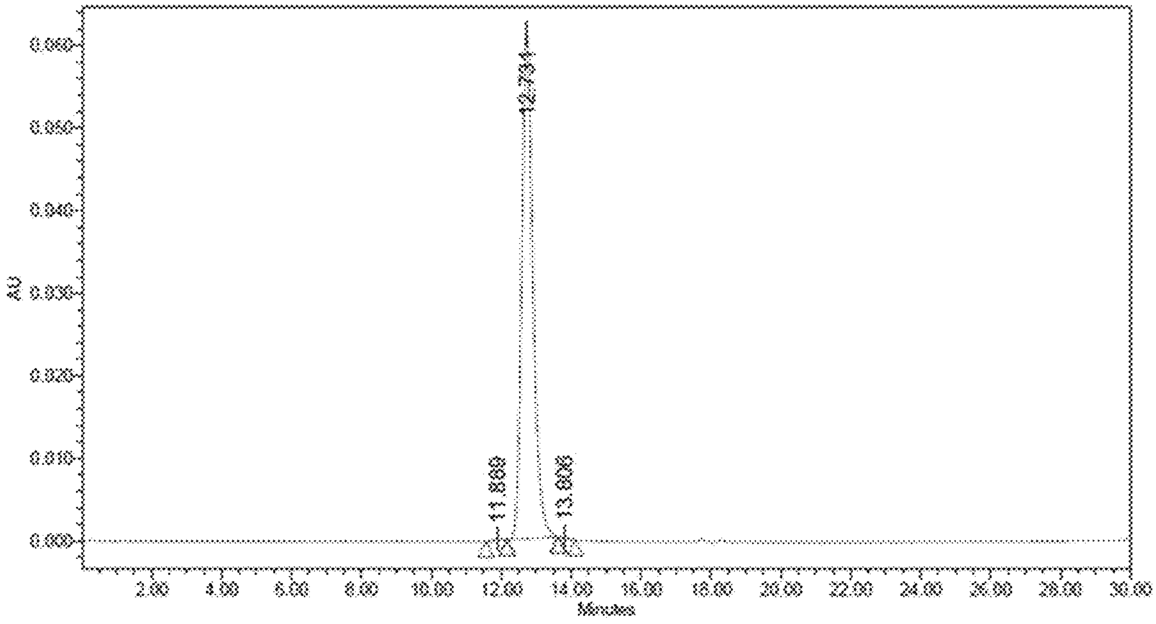
FIG. 14 illustrates the result of SEC-HPLC analysis of the final purified CRM197, wherein the purity was 99% or more.
Figure 15:
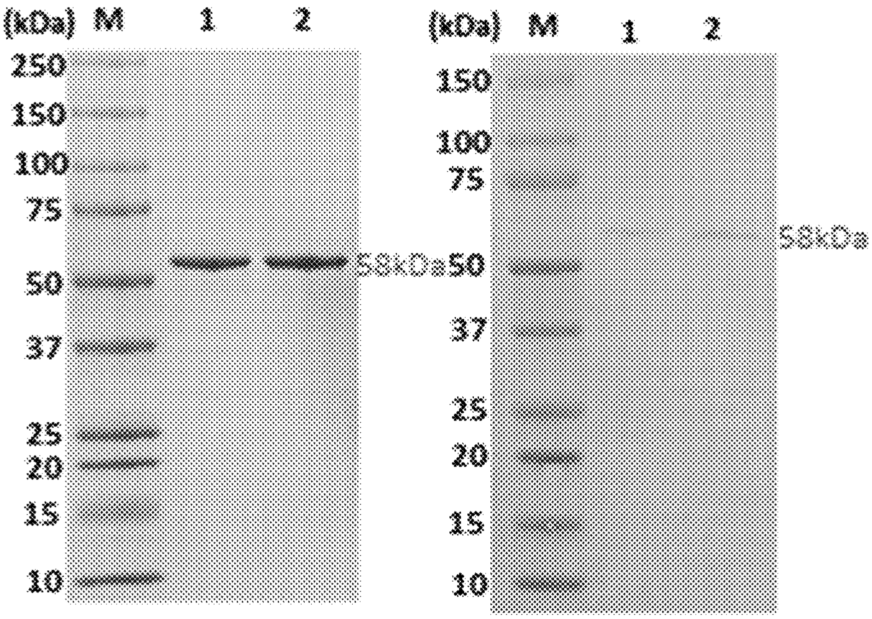
FIG. 15 shows results of SDS-PAGE (left) and Western blot (right). Line 1 is CRM197 produced by *Corynebacterium* and line 2 is CRM197 produced by *E. coli* (L3). Both CRM197 showed bands at the same location.

The quality and characteristics of the final purified CRM197 were analyzed. As a result of SEC-HPLC analysis, it was found that the purity was 99% or more (FIG. 14). SDS-PAGE and Western blotting analysis showed that a band appeared at the same position as that of CRM197 produced using *Corynebacterium* (FIG. 15).

Figure 16:
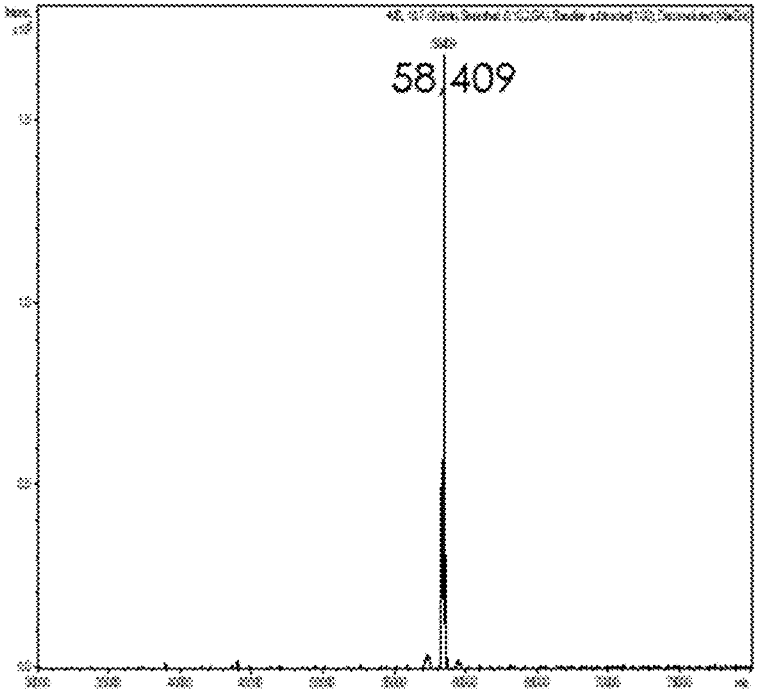
FIG. 16 illustrates the result of intact protein molecular mass analysis using LC/MS, wherein the molecular weight was 58,409 Da, which corresponds to the theoretical molecular weight.
Figure 17:
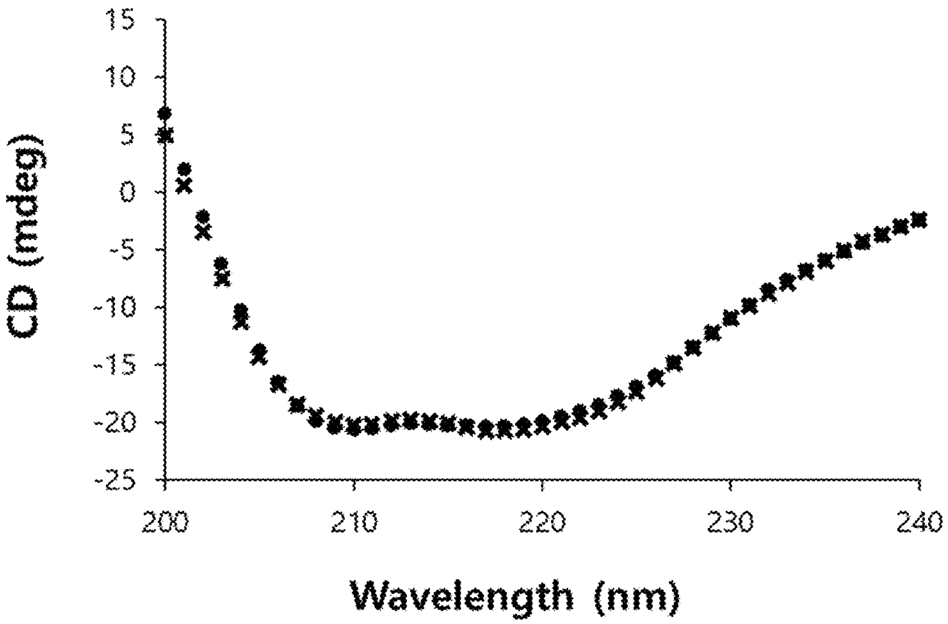
FIG. 17 illustrates the result of circular dichroism (CD) analysis and indicates that there is no difference in higher-order structure between CRM197 (•) produced by *Corynebacterium* and CRM197 (X) produced by *E. coli* pHex-L3.
Figure 18:
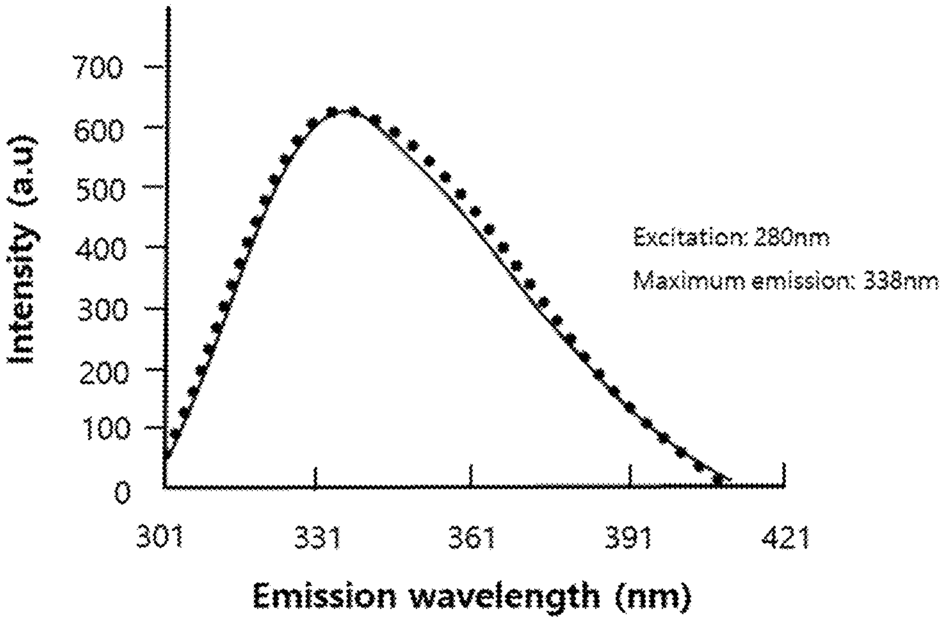
FIG. 18 illustrates the result of fluorescence spectrum analysis, wherein CRM197 (•) produced by *Corynebacte-*

In addition, the entire sequence of 535 amino acids constituting CRM197 was found to be 100% identical, and as a result of molecular weight measurement, a main peak of 58,409 Da was identified, which corresponded to the theoretical molecular weight (FIG. 16). The higher-order structure was identified through circular dichroism (CD) analysis, and it was found that there was no difference in the higher-order structure with the CRM197 produced using *Corynebacterium* (FIG. 17). Fluorescence spectrum analysis showed that the maximum emission wavelength was 338 nm, which was the same as that of the CRM197 produced using *Corynebacterium* (FIG. 18).

The results described above showed that CRM197 produced using the *E. coli* pHex-L3 strain was physicochemically and immunologically the same as the CRM197 produced using *Corynebacterium.*

INDUSTRIAL APPLICABILITY

The present invention is very useful for CRM197 protein production because CRM197 protein having the same physicochemical/immunological properties as the protein isolated from the parent bacteria can be expressed in general *E. coli* in which the redox potential is not regulated, and CRM197 protein having high secretion efficiency into the periplasm can be produced without a shift of pH of the medium for increasing secretion into the periplasm.

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

SEQUENCE LISTING FREE TEXT

An electronic file is attached.

The invention claimed is:

1. A nucleic acid comprising a nucleotide sequence encoding a signal sequence for expressing a CRM197 protein, wherein the nucleotide sequence is SEQ ID NO: 8.

2. A nucleic acid construct comprising the nucleic acid according to claim 1 and a gene of the CRM197 protein.

3. The nucleic acid construct according to claim 2, wherein the gene of the CRM197 protein comprises the nucleotide sequence of SEQ ID NO: 2.

4. An expression vector comprising the nucleic acid according to claim 1 and a gene of the CRM197 protein.

5. The expression vector according to claim 4, wherein the gene of the CRM197 protein comprises the nucleotide sequence of SEQ ID NO: 2.

6. The expression vector according to claim 4, further comprising a Tre promotor.

7. A recombinant microorganism, wherein the recombinant microorganism is transformed with the nucleic acid construct according to claim 2 or is transformed with an expression vector comprising said nucleic acid construct.

8. The recombinant microorganism according to claim 7, wherein the recombinant microorganism is *Escherichia coli*.

9. A method for producing a CRM197 protein comprising:

(a) culturing the recombinant microorganism according to claim 7 to produce a CRM197 protein; and (b) recovering the produced CRM197 protein.

10. The method according to claim 9, wherein the step (b) comprises recovering the CRM197 protein secreted into periplasm.

* * * * *